United States Patent
Ahuja et al.

(10) Patent No.: US 10,248,173 B2
(45) Date of Patent: Apr. 2, 2019

(54) DETERMINING THERMAL MARGINS IN A MULTI-DIE PROCESSOR

(71) Applicant: Intel Corporation, Santa Clara, CA (US)

(72) Inventors: Sandeep Ahuja, University Place, WA (US); Jeremy Ridge, Seattle, WA (US); Michael Berktold, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 15/086,387

(22) Filed: Mar. 31, 2016

(65) Prior Publication Data
US 2017/0285699 A1  Oct. 5, 2017

(51) Int. Cl.
- *G06F 1/20* (2006.01)
- *G06F 1/32* (2006.01)
- *G06F 1/3203* (2019.01)
- *G01K 3/08* (2006.01)

(52) U.S. Cl.
CPC .......... *G06F 1/206* (2013.01); *G06F 1/3203* (2013.01)

(58) Field of Classification Search
CPC ...... G06F 1/206; G06F 1/3225; G06F 1/3203; G01K 3/08
USPC ........................................................ 700/282
See application file for complete search history.

(56) References Cited

U.S. PATENT DOCUMENTS

| | | | |
|---|---|---|---|
| 5,838,578 A * | 11/1998 | Pippin | G06F 1/206 327/512 |
| 8,260,474 B2 | 9/2012 | Ahuja et al. | |
| 2006/0179334 A1 * | 8/2006 | Brittain | G06F 1/206 713/320 |
| 2007/0010963 A1 * | 1/2007 | Gaskins | G06F 1/206 702/132 |
| 2010/0205464 A1 | 8/2010 | Rotem et al. | |
| 2012/0110352 A1 | 5/2012 | Branover et al. | |
| 2012/0249218 A1 * | 10/2012 | Shoemaker | G01K 3/08 327/512 |
| 2013/0060399 A1 | 3/2013 | Ahuja et al. | |
| 2014/0245032 A1 | 8/2014 | Vadakkanmaruveedu et al. | |

(Continued)

OTHER PUBLICATIONS

International Searching Authority, "Notification of Transmittal of the International Search Report and the Written Opinion of the International Searching Authority," dated May 2, 2017 in International application No. PCT/US2017/014835.

(Continued)

*Primary Examiner* — Michael J Brown
(74) *Attorney, Agent, or Firm* — Trop, Pruner & Hu, P.C.

(57) ABSTRACT

In one embodiment, a processor comprises: a first die including at least one core and at least one first die thermal sensor; a second die including at least one memory and at least one second die thermal sensor; and a thermal controller to receive first thermal data from the at least one first die thermal sensor and second thermal data from the at least one second die thermal sensor, calculate a first thermal margin for the first die based at least in part on the first thermal data and a first thermal loadline for the first die and calculate a second thermal margin for the second die based at least in part on the second thermal data and a second thermal loadline for the second die. Other embodiments are described and claimed.

14 Claims, 21 Drawing Sheets

(56) References Cited

U.S. PATENT DOCUMENTS

2014/0334107 A1    11/2014   Heresztyn et al.
2015/0094875 A1*   4/2015    Duzly ............... G05D 23/1919
                                                               700/300

OTHER PUBLICATIONS

Intel Technology Journal, "Power and Thermal Management in the Intel Core Duo Processor," May 15, 2006, pp. 109-122.
U.S. Appl. No. 14/852,859, filed Sep. 14, 2015, entitled "Apparatus and Method to Provide a Thermal Parameter Report for a Multi-Chip Package," by Tessil Thomas, et al.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
Intel Corporation, "CPU Monitoring With DTS/PECI," Sep. 2010, 23 pages.

\* cited by examiner

US 10,248,173 B2

DETERMINING THERMAL MARGINS IN A MULTI-DIE PROCESSOR

TECHNICAL FIELD

Embodiments relate to thermal management of a system, and more particularly to thermal management of a multi-die integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, power and thermal requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

To enable long term life of modern processors, a thermal loadline specification methodology is used. This methodology calls for lower temperature operation at lower power levels, and higher temperature operation is allowed if the processor is dissipating higher power. This specification is typically realized as a curve of temperature with respect to power. By controlling a processor with this methodology, an average operating temperature of the device is reduced over lifetime. While this loadline specification methodology works favorably for a single die, it does not extend to multiple die processors, as different dies incorporated into a package have different temperature limits. In addition, the loadline specification does not extend as package power becomes the sum of powers of all devices in the package, and operating temperature of dies in the package is determined not only by the total power of the package, but also by how the power is distributed among the various dies.

DETAILED DESCRIPTION

Figure 1:
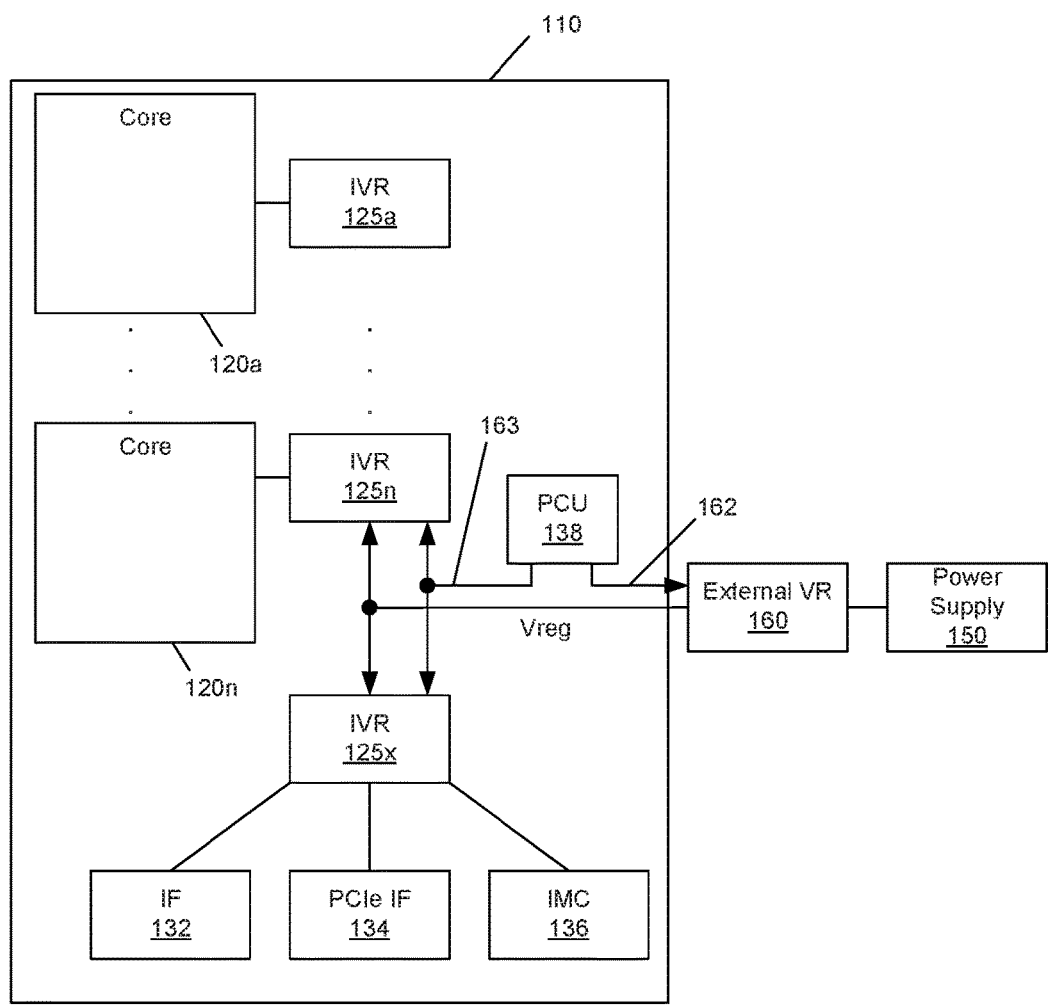
FIG. 1 is a block diagram of a portion of a system in accordance with an embodiment of the present invention.

Although the following embodiments are described with reference to thermal control and energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below.

In various embodiments, a multi-die processor (such as a multi-chip package (MCP)) may be implemented with multiple thermal loadlines, each for a die of the package. These multiple thermal loadlines can be leveraged to dynamically determine thermal operating parameters and provide at least certain information to one or more destinations, including an external platform controller. In addition, the thermal operating parameters calculated or otherwise determined may be used for processor operating parameter control and power management.

Embodiments further provide techniques for providing real time metrics for specification compliance. Based at least in part on thermal operating parameters obtained as described herein, a throttle situation may be avoided by maintaining an optimum margin to a throttle level by factoring in a sensed junction temperature (Tj) value and power dissipation; Tj limit, and thermal design power (TDP) limit for each die type. Embodiments enable a throttle margin to extend close to zero if a given die is already dissipating power close to its TDP limit. As such, embodiments enable specification of one or more thermal loadlines for a MCP to realize a way to maximize product performance while minimizing fan speed. In some embodiments, a power controller may include power management code, or so-called p-code, which in an embodiment may be implemented as microcode of a dedicated microcontroller of a processor, to calculate an optimum thermal margin to prevent throttling. In an embodiment, this optimum value may be calculated based on a determined power dissipation and current Tj of each die and its Tj and TDP limits. Thermal specifications of a multi-chip package as described herein provide thermal loadline characteristics that lower the average operating temperature of the device over its lifetime, and can further be used to calculate a thermal margin that may be exposed to a platform for fan speed or other cooling solution management.

Referring now to FIG. 1, shown is a block diagram of a portion of a system in accordance with an embodiment of the present invention. As shown in FIG. 1, system 100 may include various components, including a processor 110 which as shown is a multicore processor which may be a single die or multi-die processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator $125_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform thermal and power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In addition, PCU 138 may perform thermal control as described herein, including calculation of a minimum thermal margin and communication of the same to an external platform controller.

In FIG. 1, PCU 138 is illustrated as being present as a separate logic of the processor. In other cases PCU logic 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
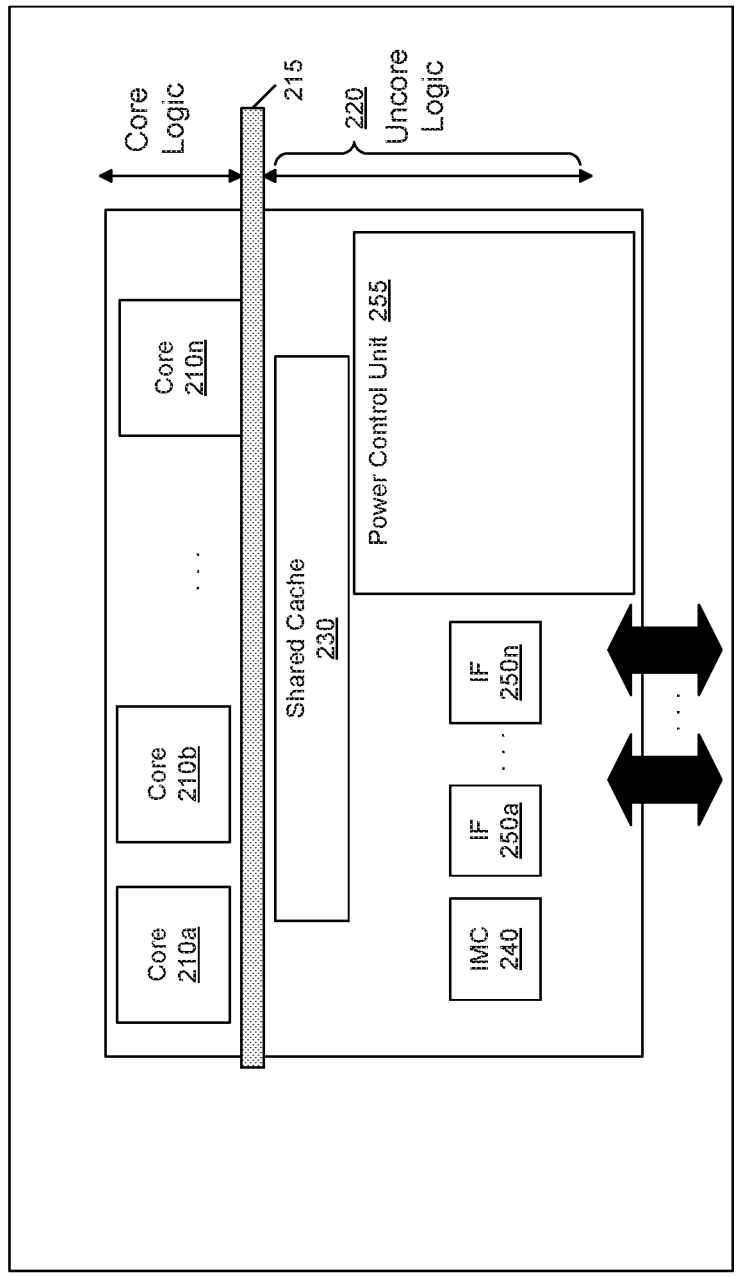
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the thermal and power management techniques described herein.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard. For example, understand that a processor package may include multiple dies, including one or more processor dies, memory dies, and fabric dies.

Figure 3:
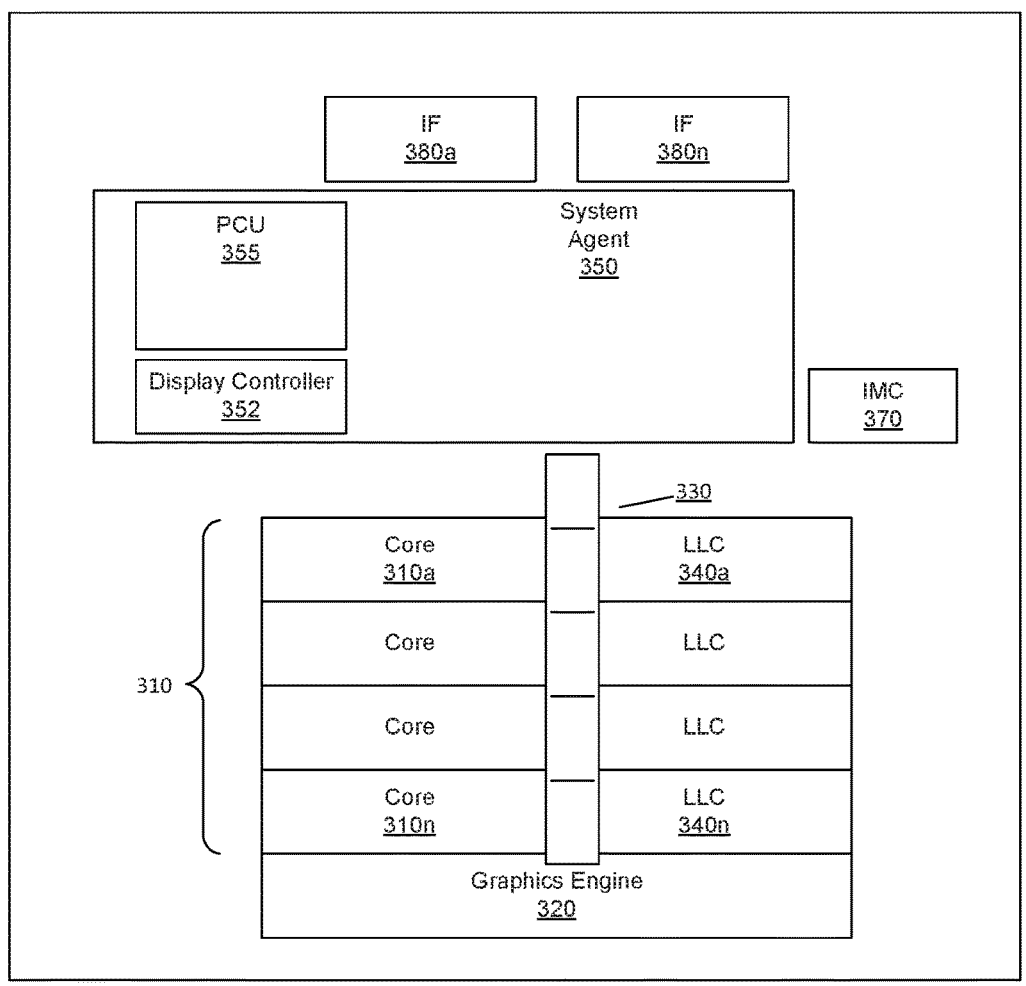
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310a$-$310n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340a$-$340n$.

In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the thermal and power management techniques described herein.

As further seen in FIG. 3, processor 300 can further include an integrated memory controller (IMC) 370 that can provide for an interface to a system memory, such as a dynamic random access memory (DRAM). Multiple interfaces 380a-380n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
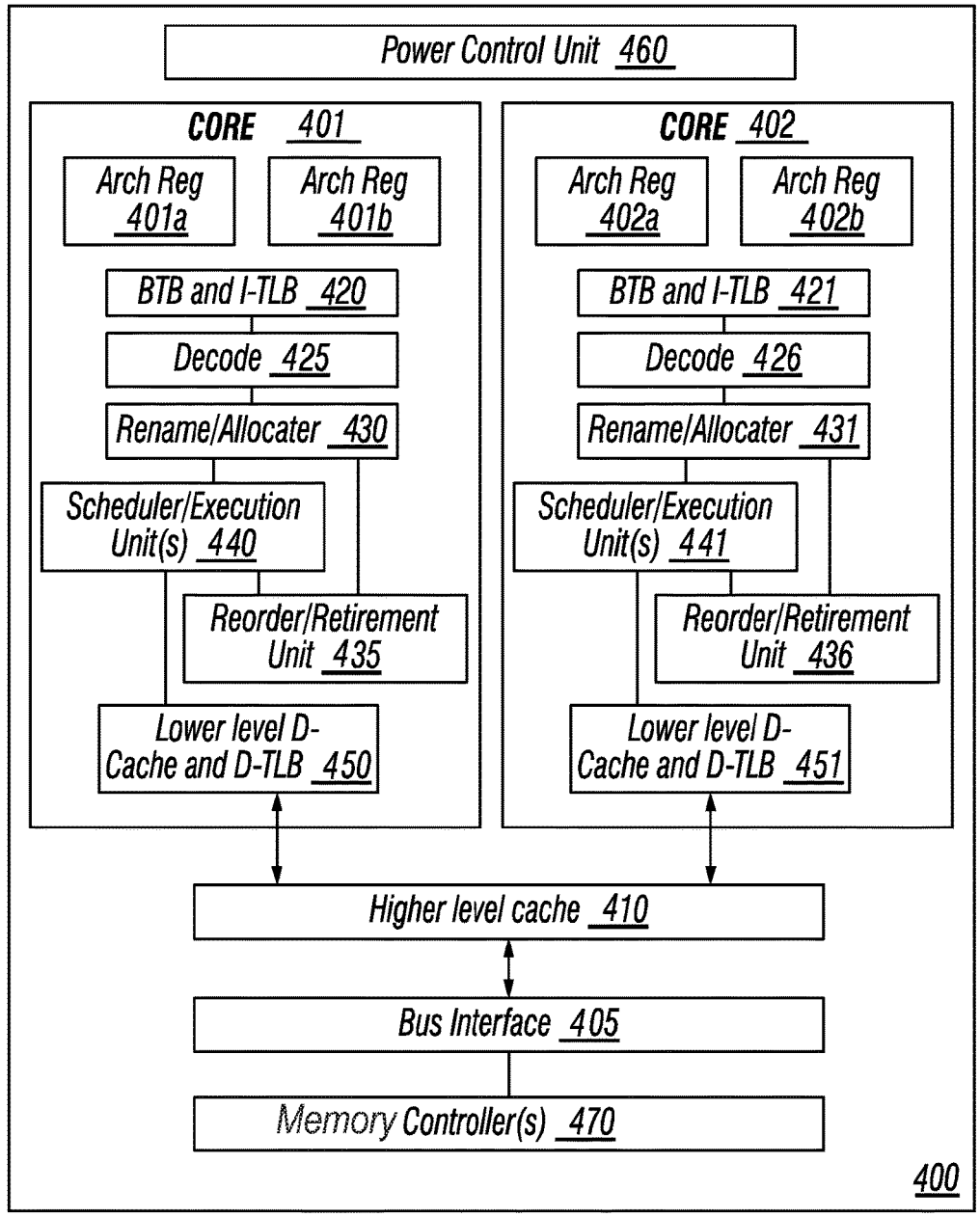
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/ specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
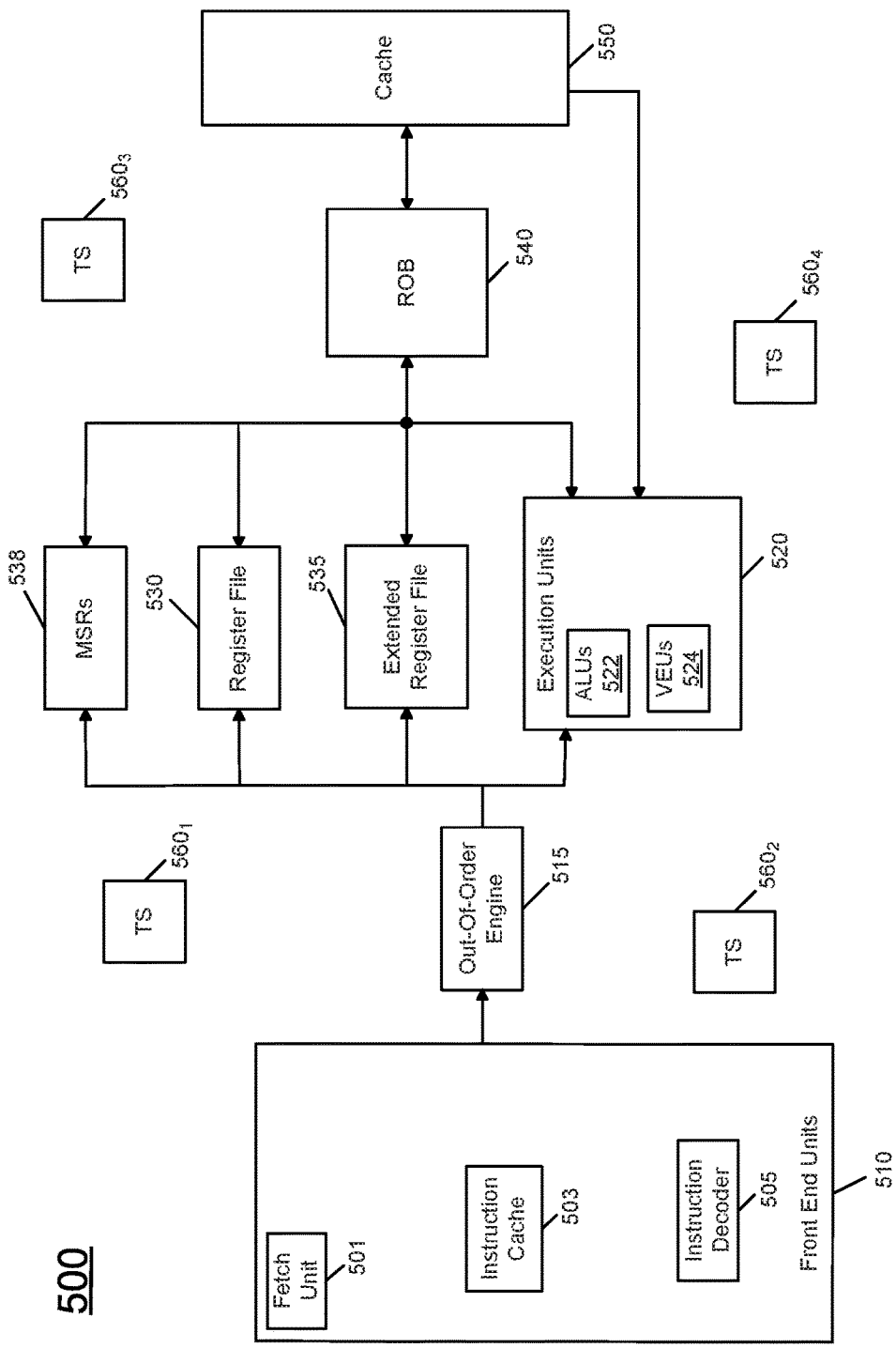
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. As further shown, core 500 may include multiple thermal sensors 560₁-560₄ to provide thermal information to, e.g., a PCU (not shown within the core). While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
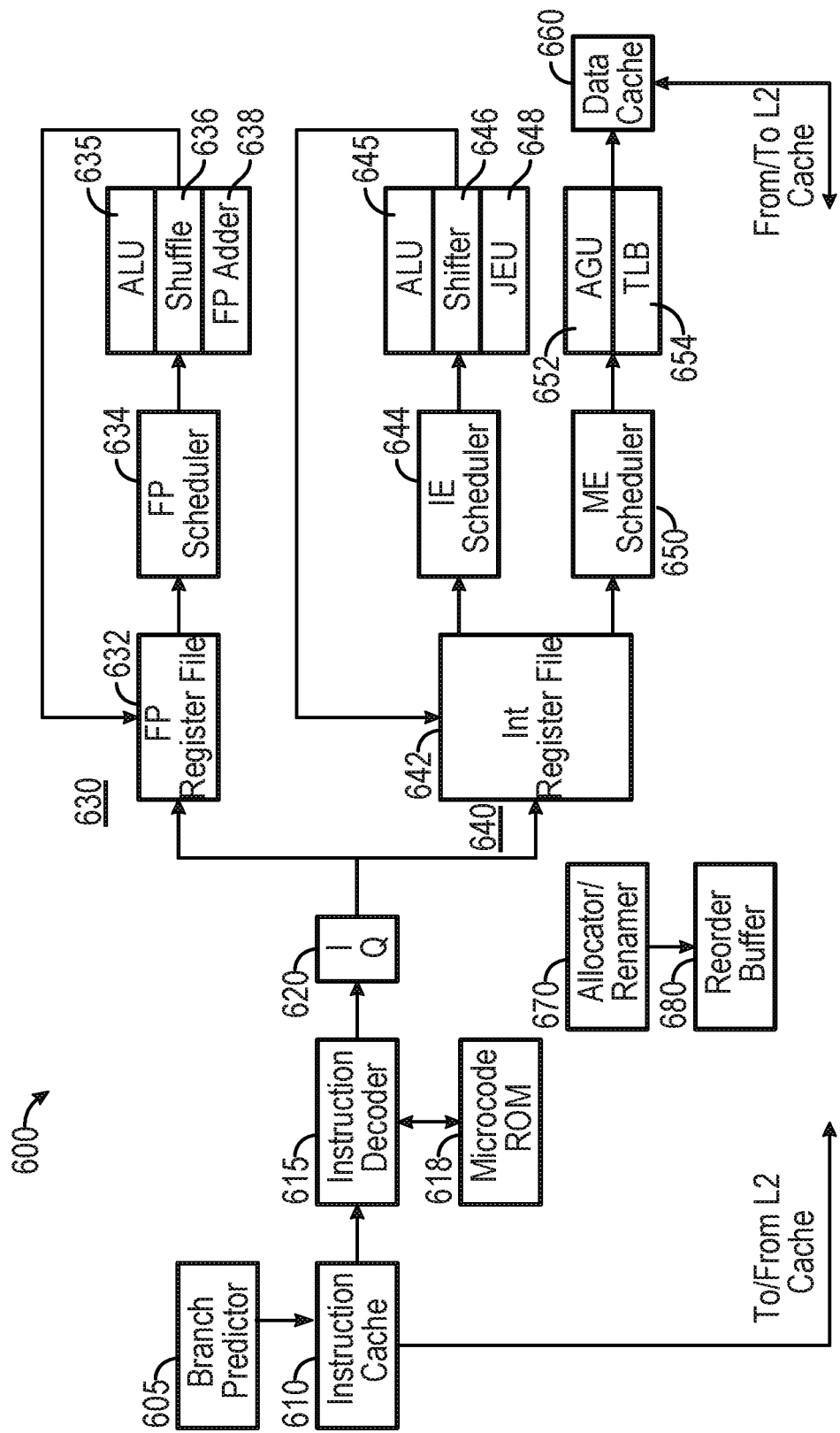
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
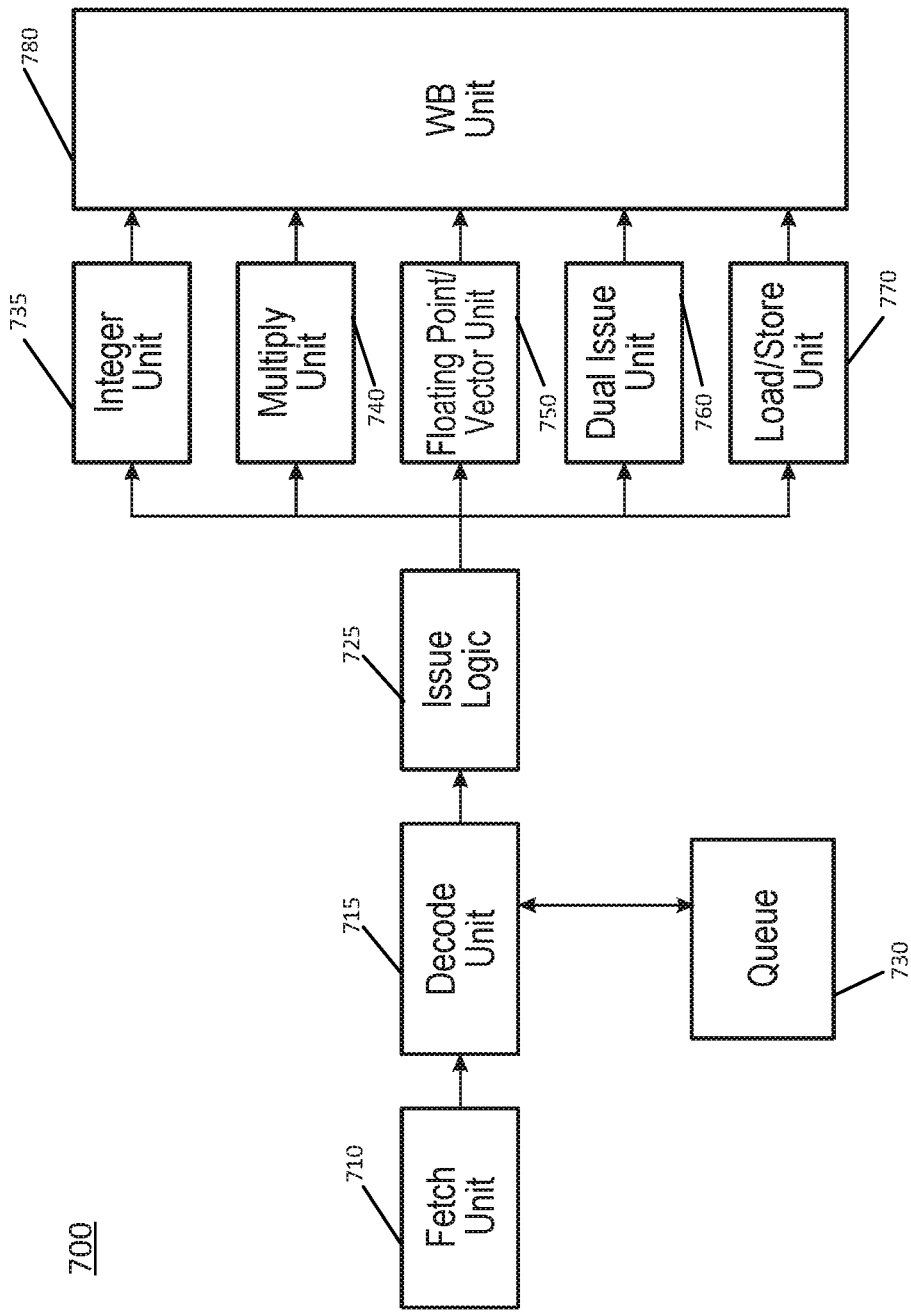
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
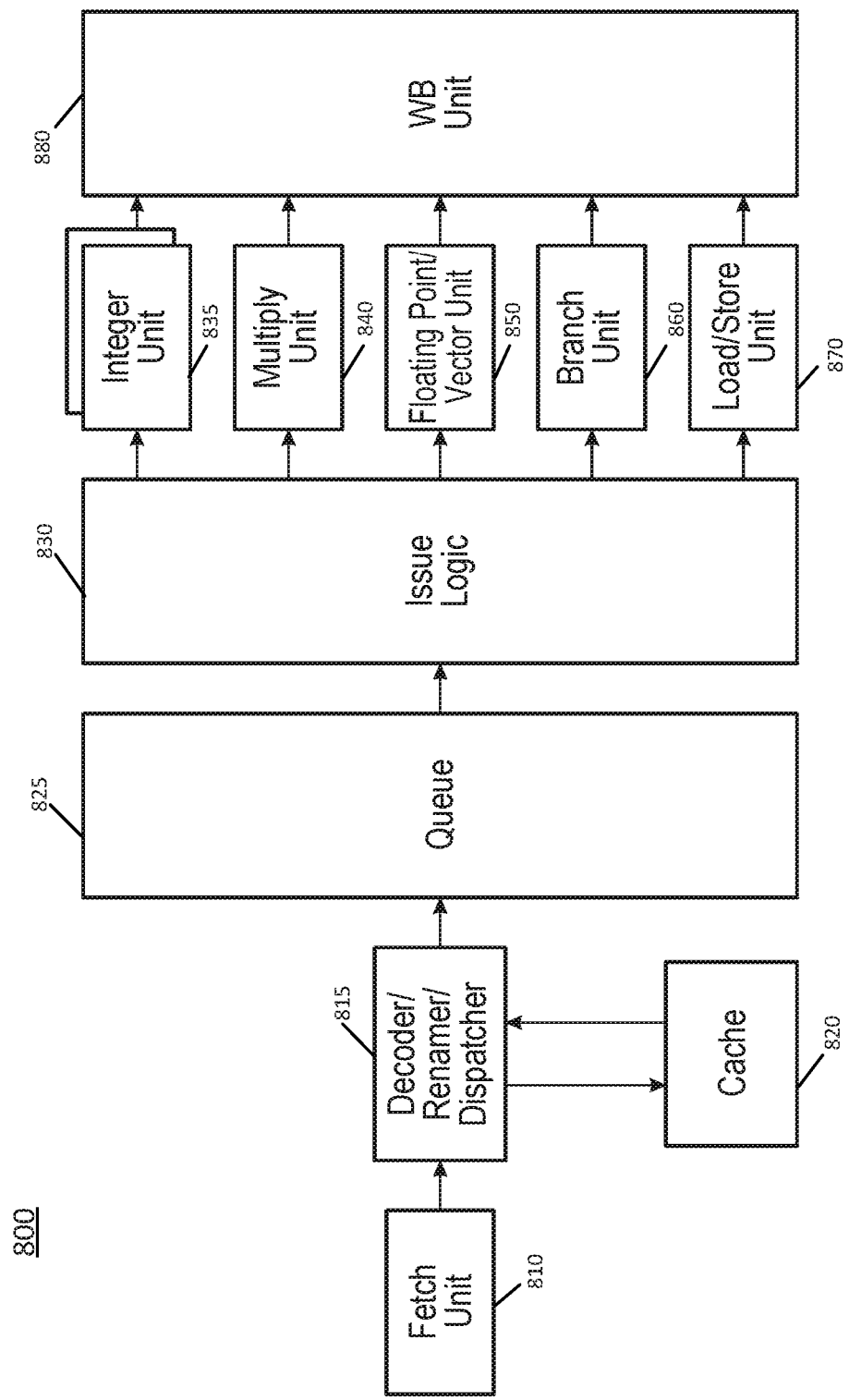
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
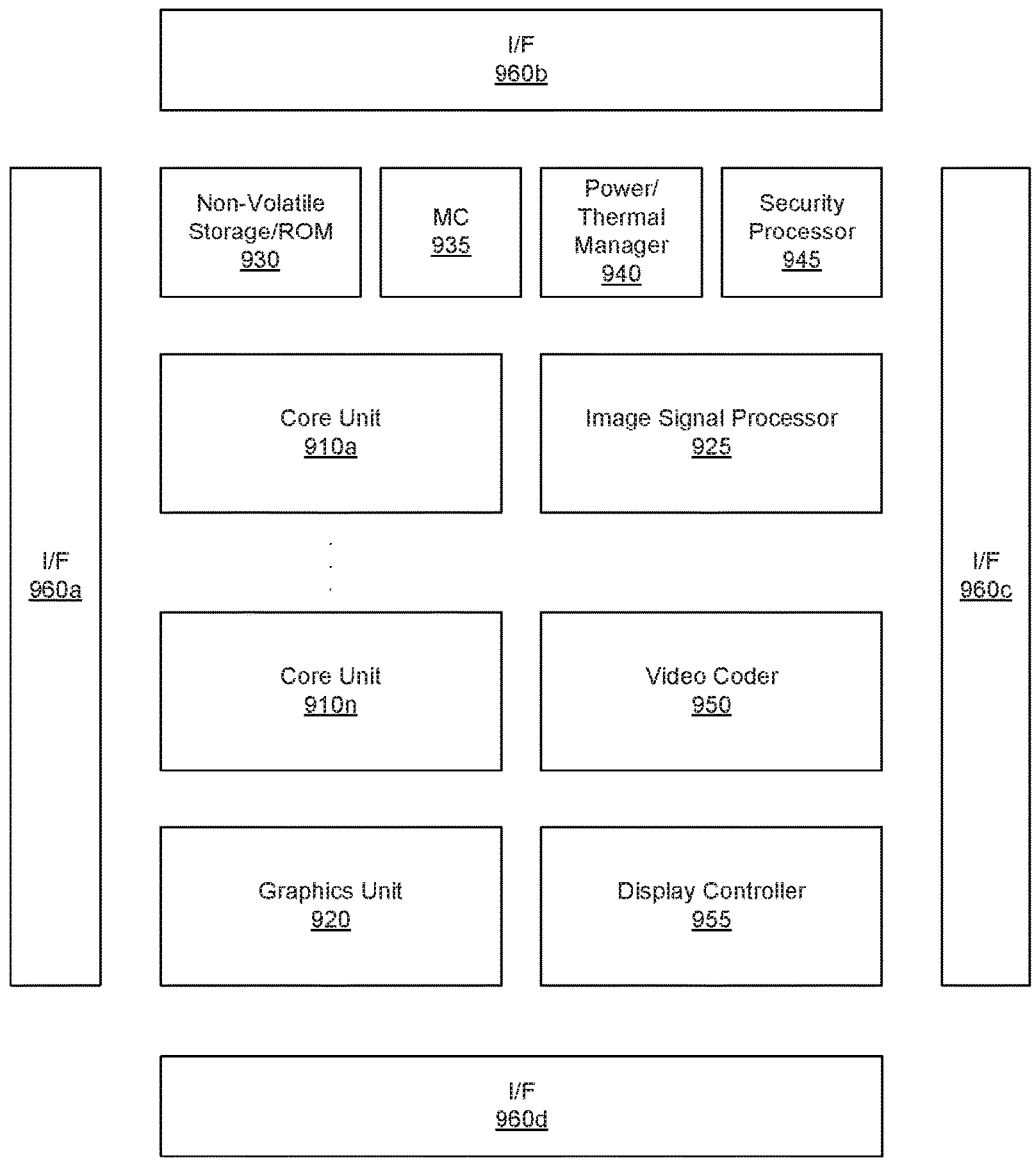
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910a-910n. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its temperature and power consumption controlled via a power/thermal manager 940, which may include control logic to perform the various thermal and power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
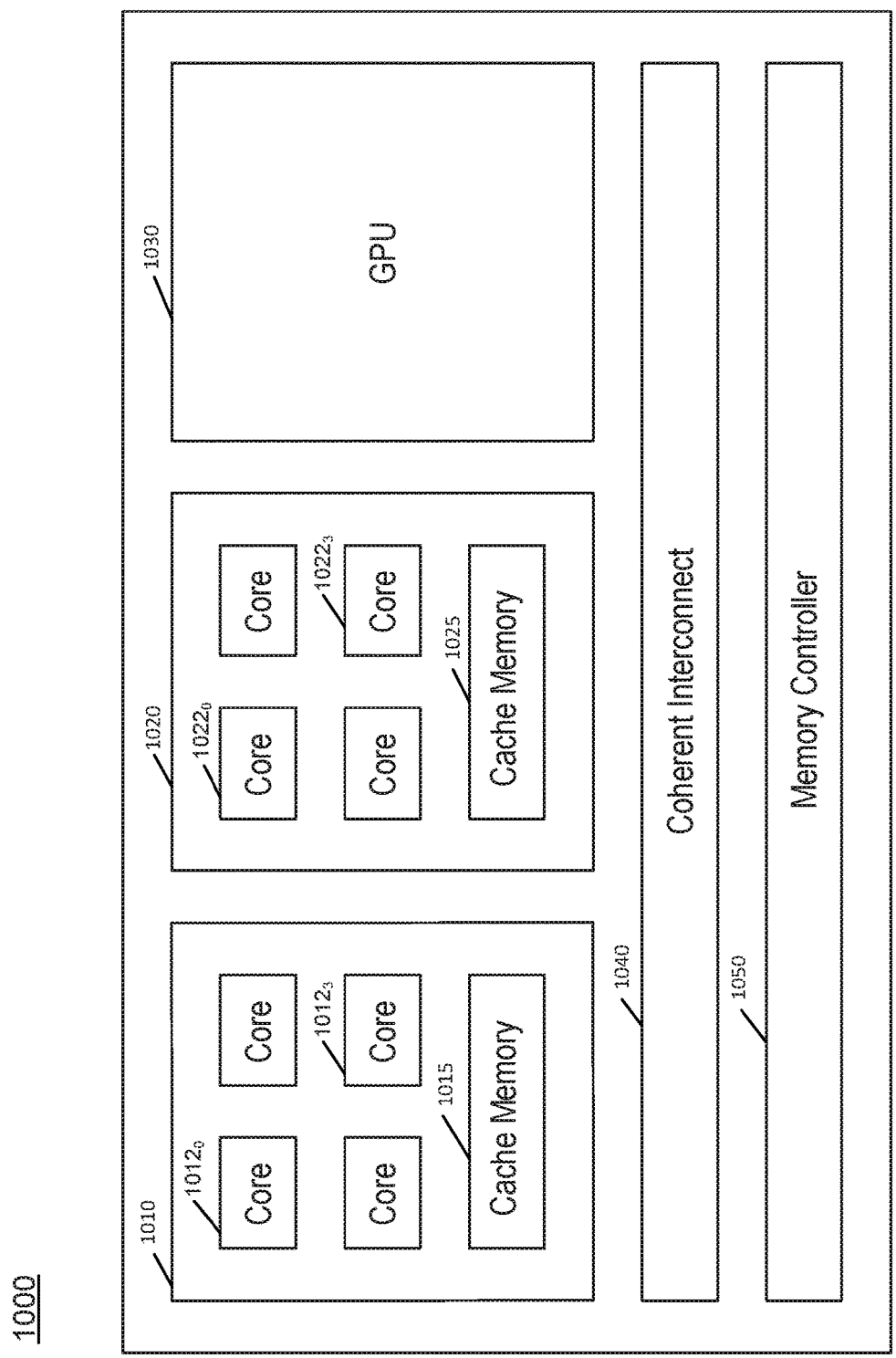
FIG. 10 is a block diagram of a representative SoC in accordance with an embodiment of the present invention.

Referring now to FIG. 10, shown is a block diagram of a representative SoC. In the embodiment shown, SoC 1000 may be a multi-core, multi-die SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012a-1012d. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022*a*-1022*d*. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
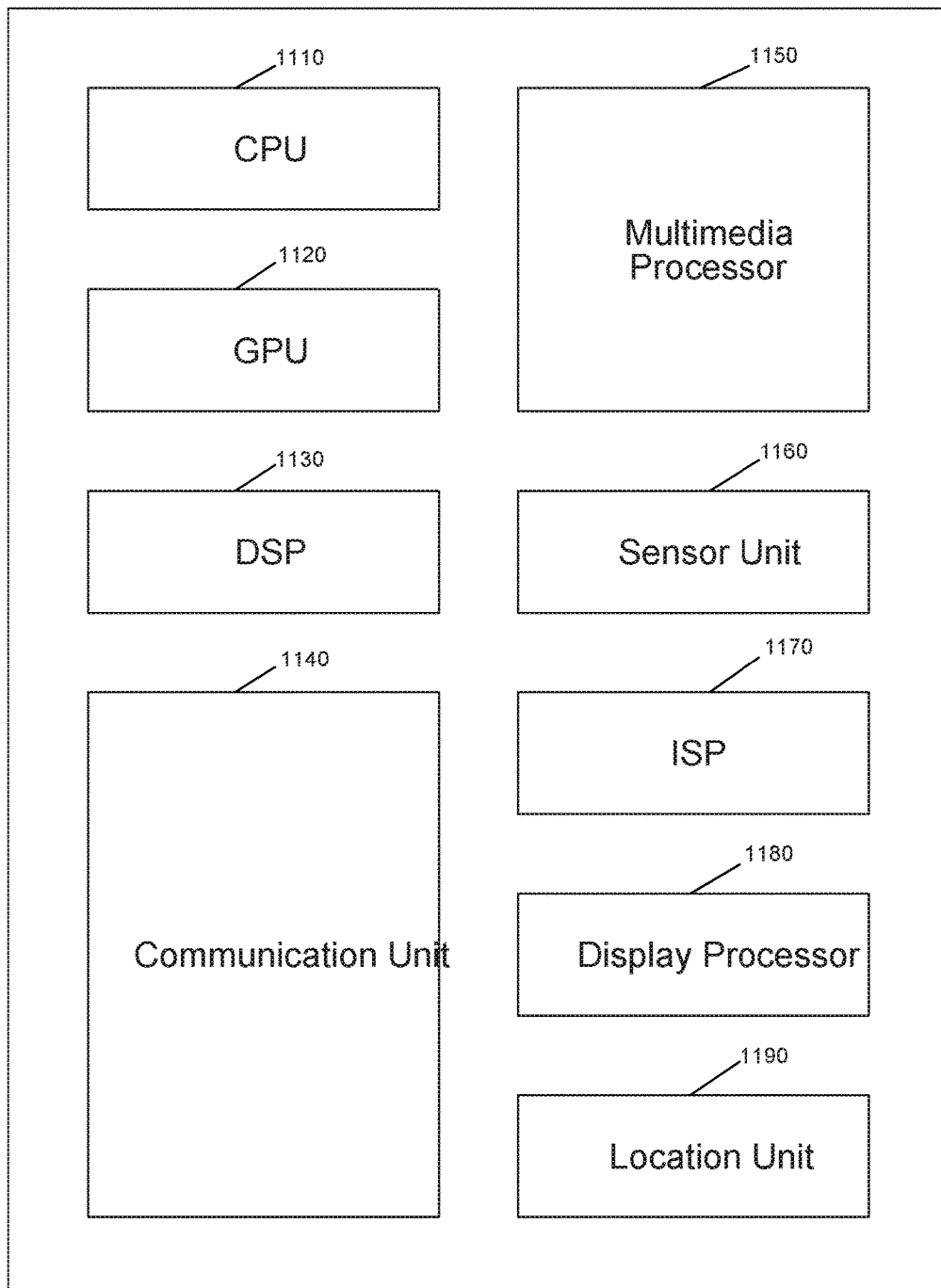
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
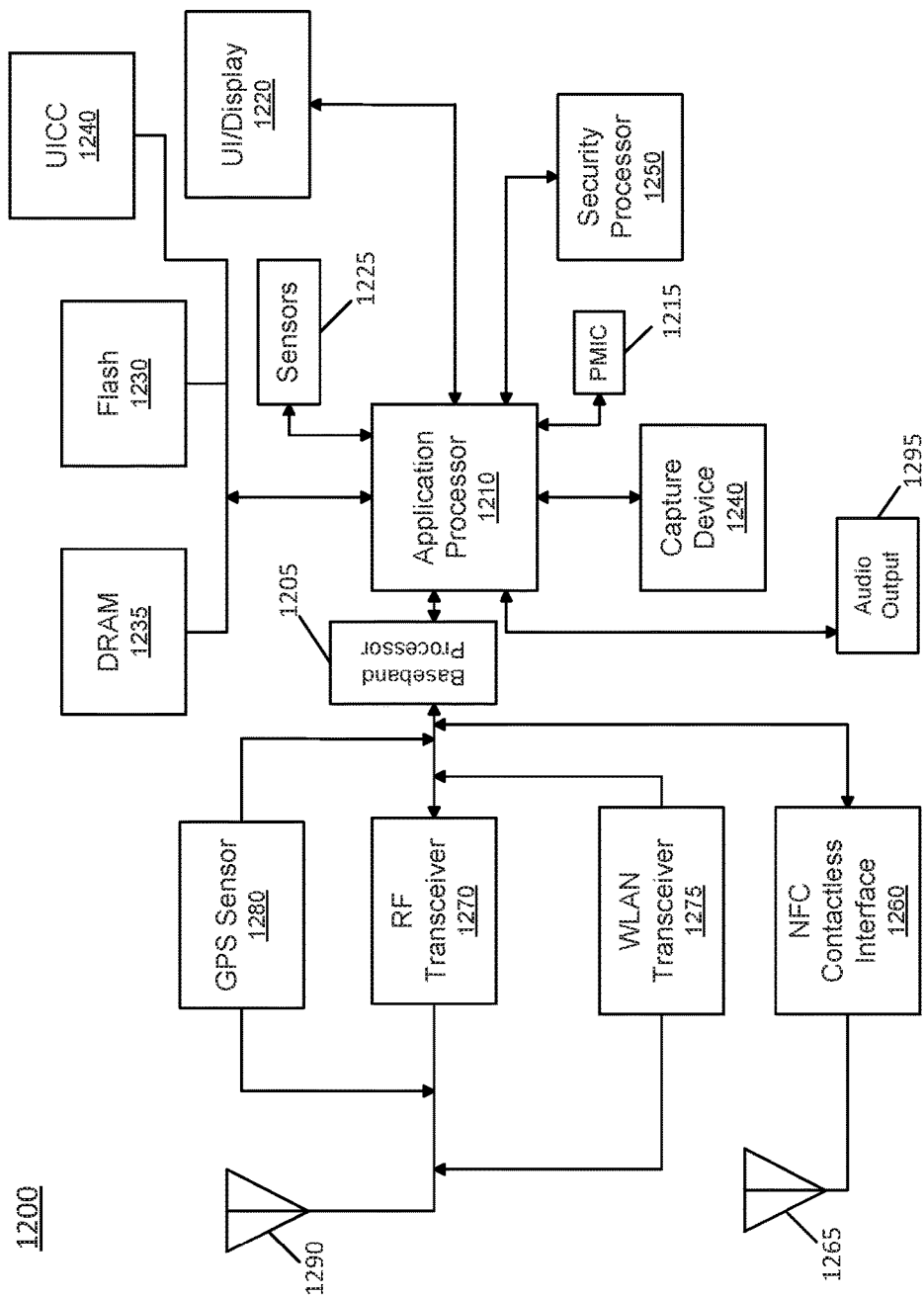
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
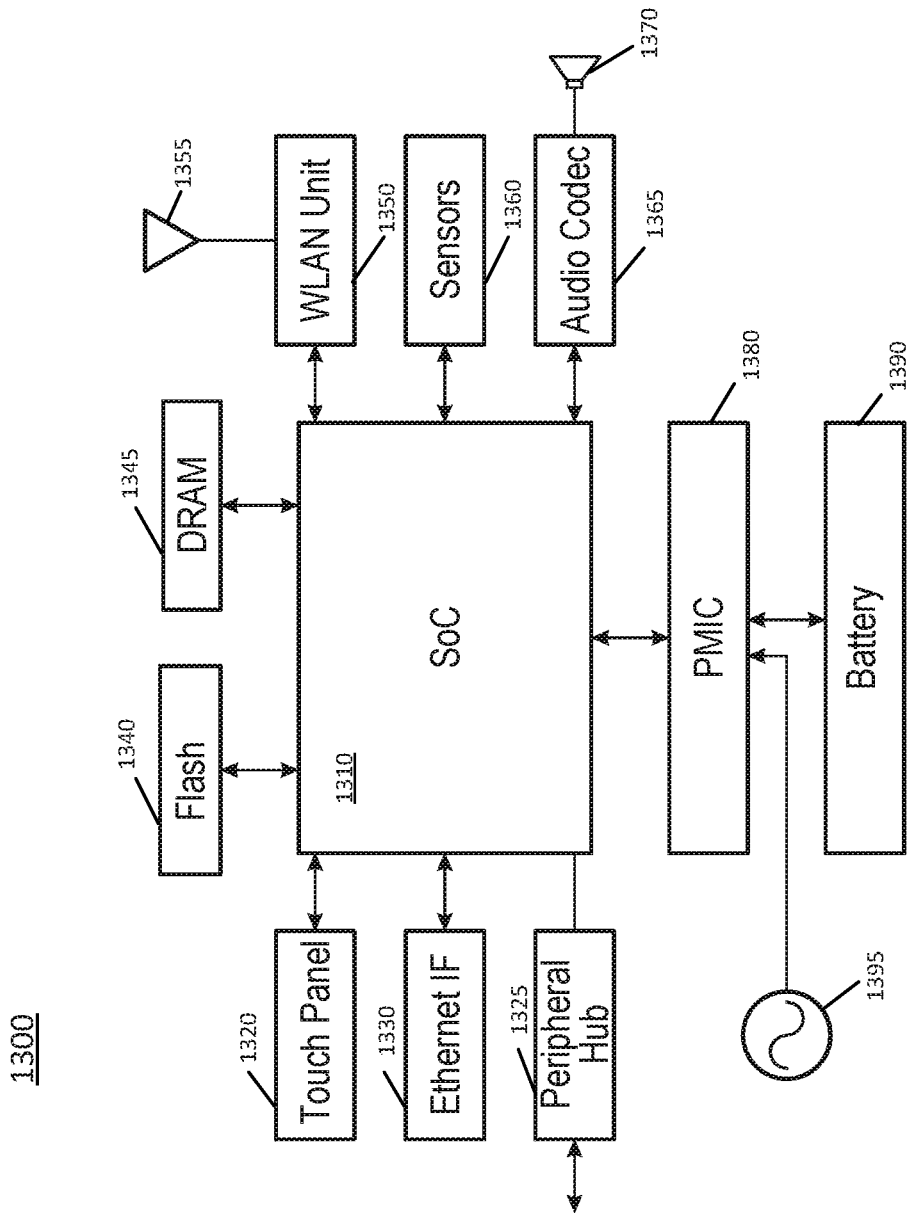
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
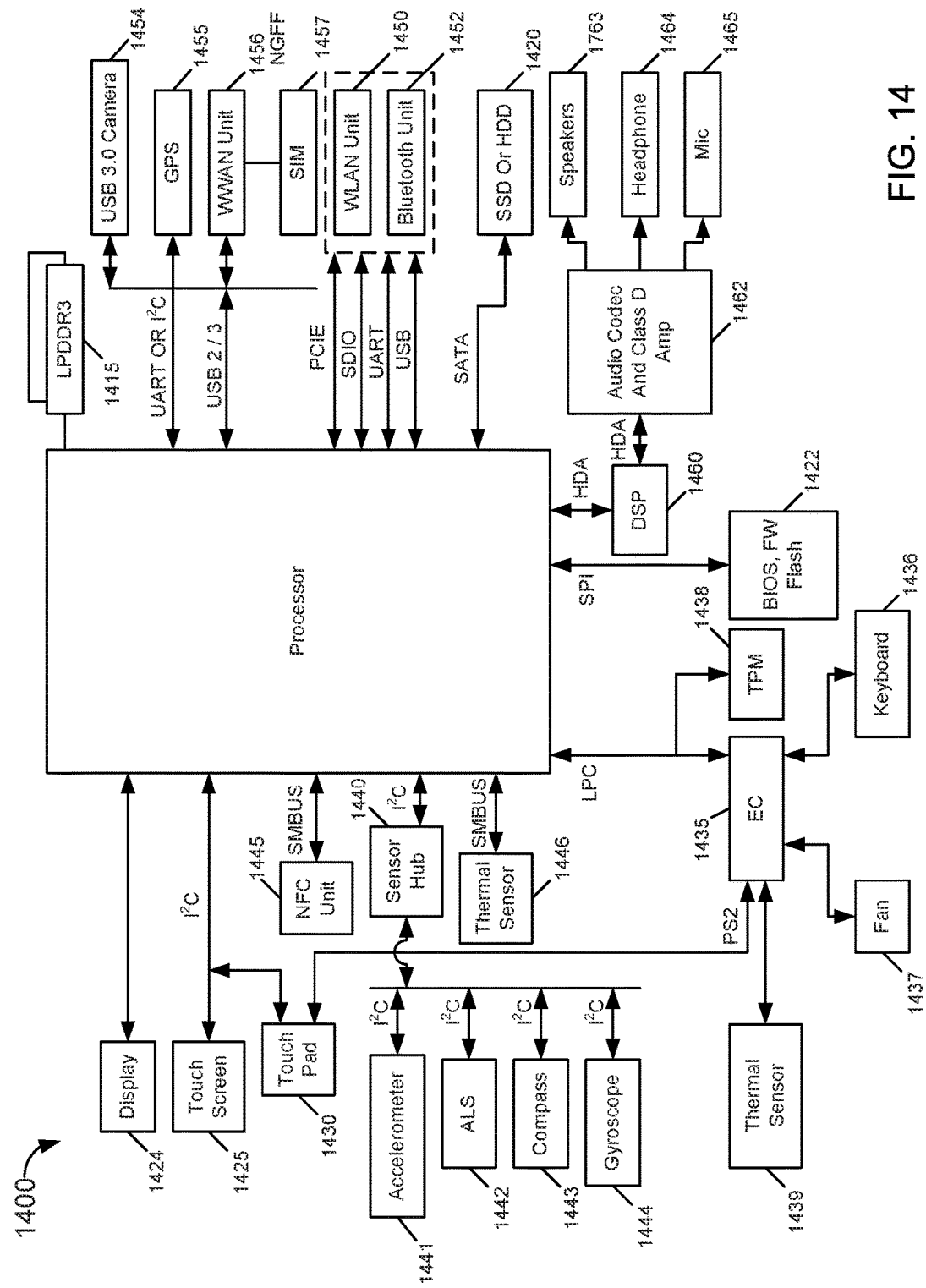
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect. In an embodiment, EC 1435 may act as a platform controller to provide control of one or more cooling solutions based at least in part on thermal margin and thermal control information received from processor 1410, as described herein.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
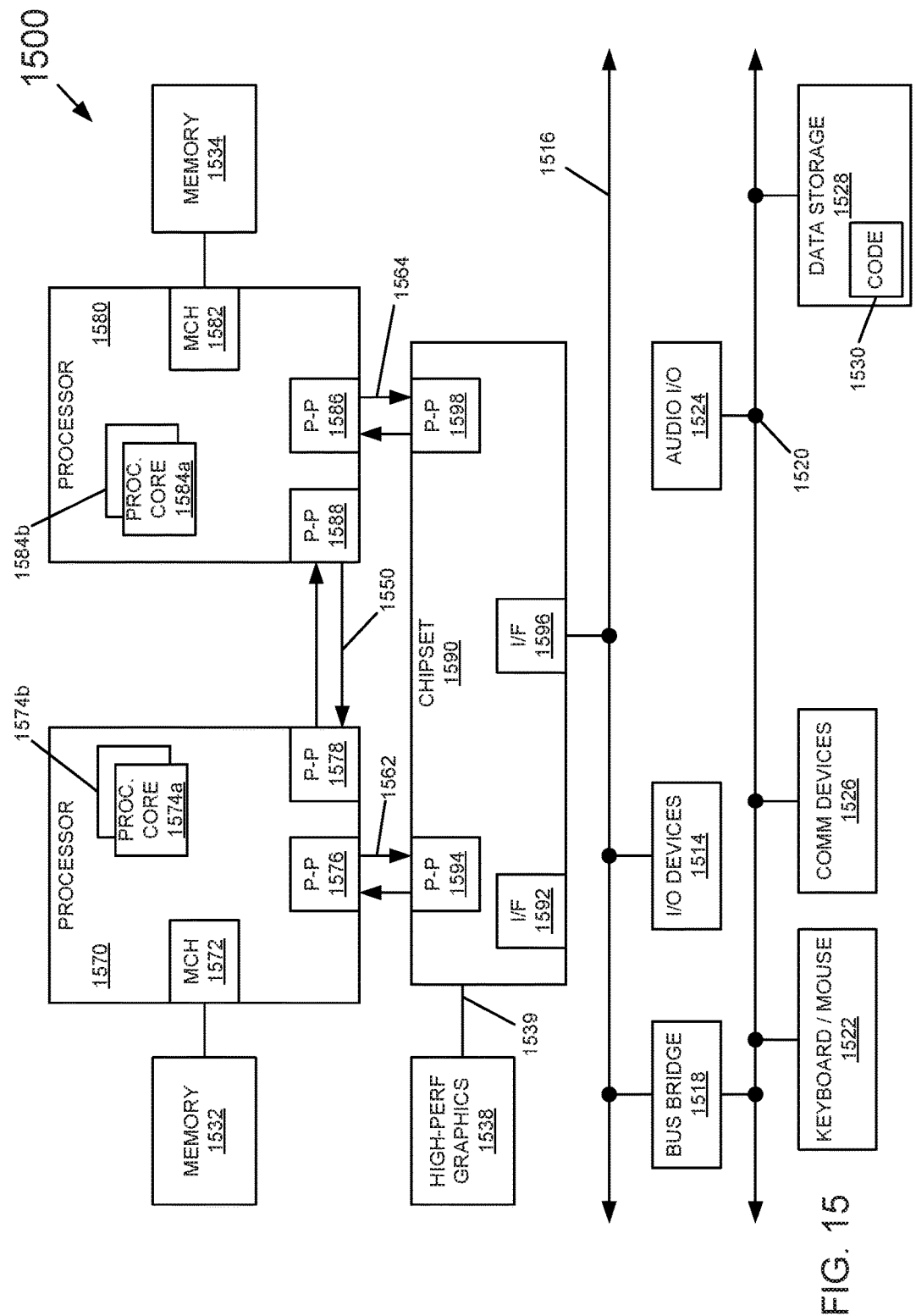
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
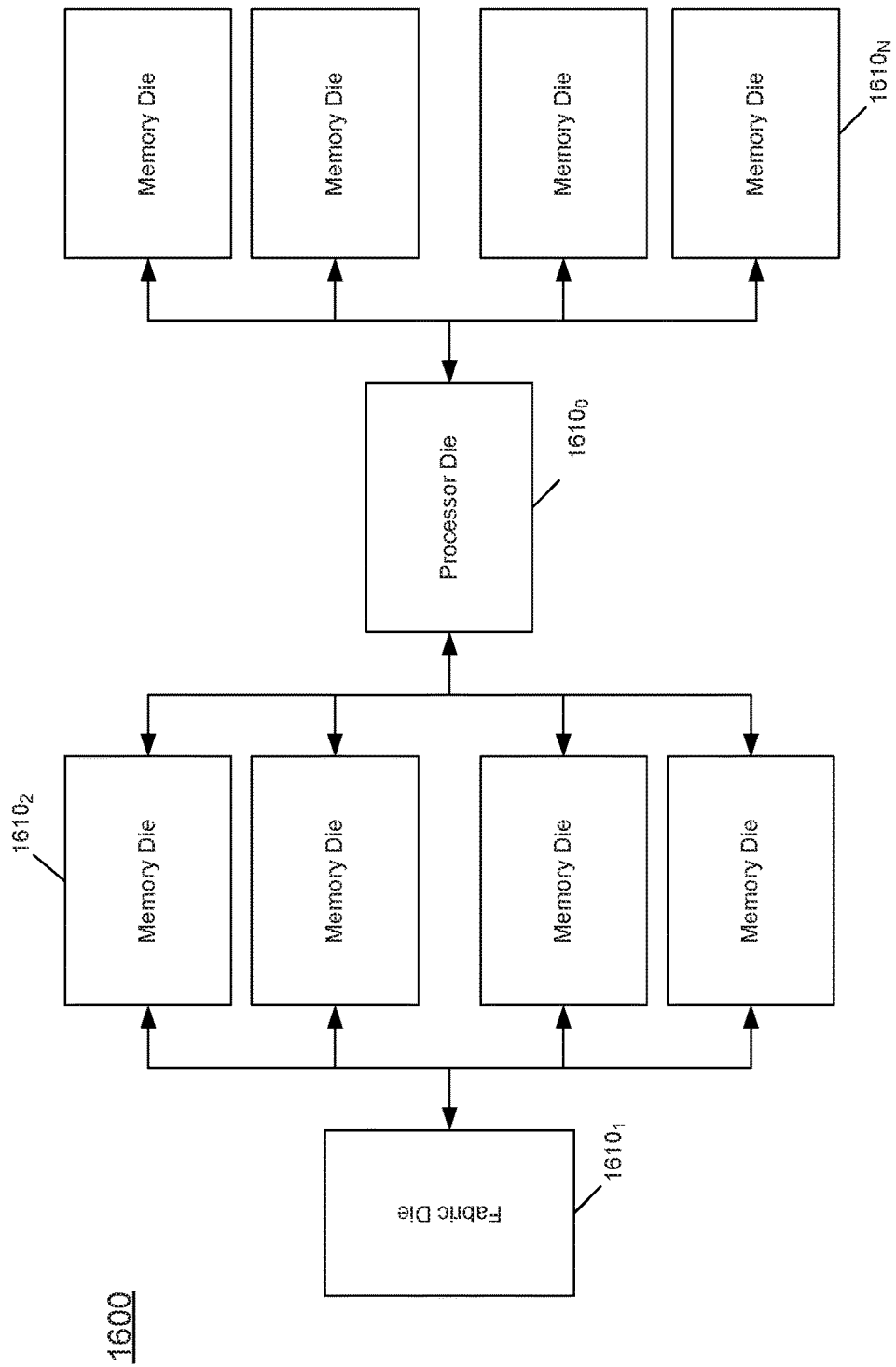
FIG. 16 is a block diagram of a multi-chip package in accordance with an embodiment of the present invention.

FIG. 16 is a block diagram of a multi-chip package 1600 in accordance with an embodiment of the present invention. MCP 1600 may include a plurality of dies $1610_0$-$1610_N$, including a processor die $1610_0$ and a fabric die $1610_1$. Processor die $1610_0$ may include a core region having a plurality of cores, a plurality of temperature sensors, and one or more cache memories. Processor die $1610_0$ may also include additional circuitry such as an uncore region having a power control unit (PCU), interconnect logic, and one or more uncore agents each with one or more temperature sensors, among other circuitry. Fabric die $1610_1$ may include one or more temperature sensors, among fabric circuitry. Additional dies $1610_2$-$1610_N$ may include one or more of dynamic random access memory (DRAM), network interface controller (NIC) die, and/or other circuitry. Each of other dies $1610_2$-$1610_N$ may include one or more temperature sensors in addition to memory cells and other circuitry. As seen by the arrows in FIG. 16, the various dies may communicate with each other. Note that in embodiments here, processor die $1610_0$ may receive thermal data from each die, along with power information.

Figure 17:
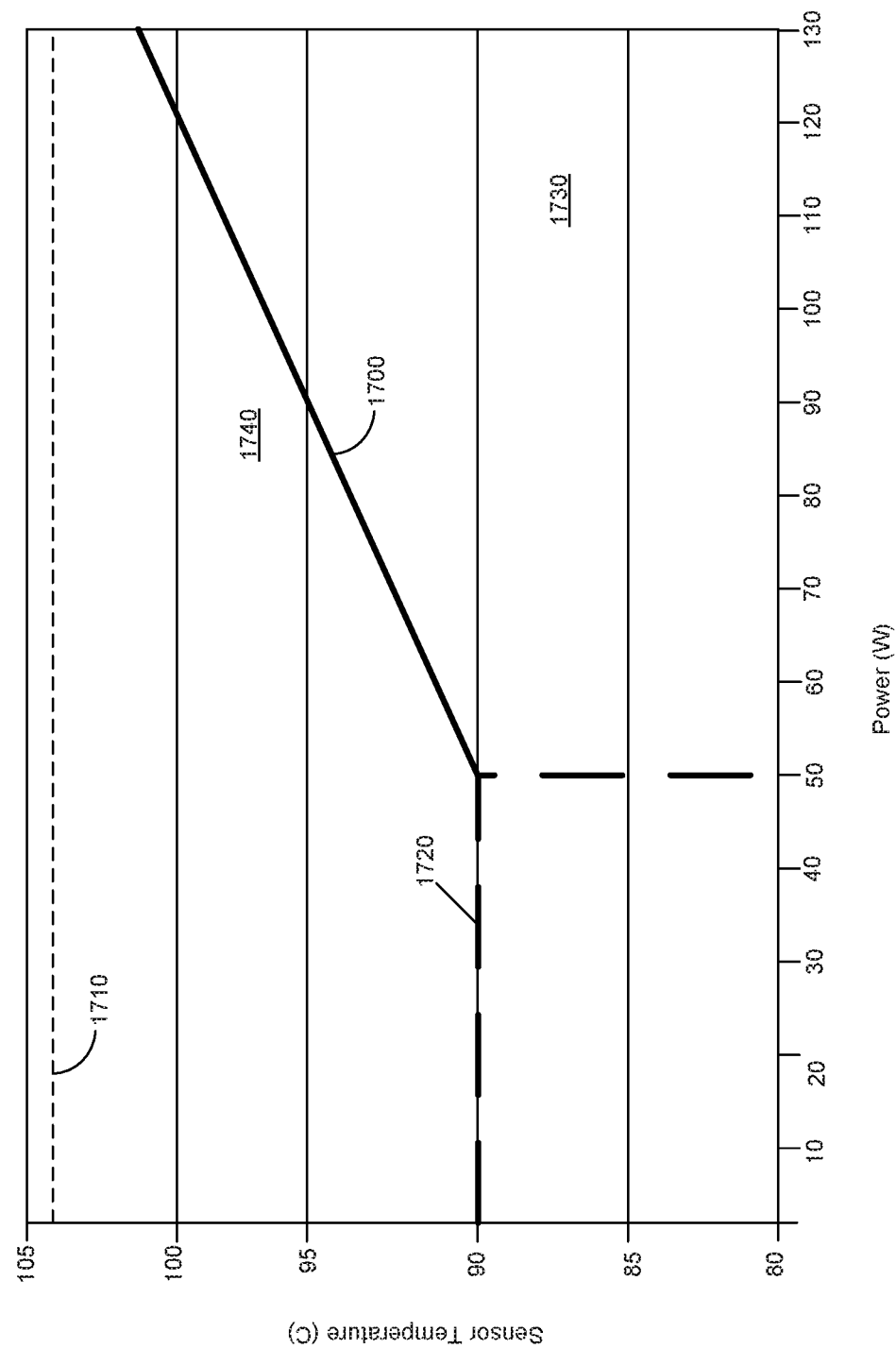
FIG. 17 is a thermal loadline for a representative die component of a processor package in accordance with an embodiment of the present invention.

Referring now to FIG. 17, shown is a thermal loadline for a representative die component of a processor package in accordance with an embodiment of the present invention. Understand that similar thermal loadlines (albeit having different values or characteristics) may be provided for each die incorporated into a package As shown in FIG. 17, a graphical illustration is presented having a thermal loadline 1700, in which the y-axis represents device temperature and the x-axis represents device power.

As further illustrated in FIG. 17, a throttle threshold 1710 is provided. Throttle threshold 1710 may be a predetermined threshold temperature at which immediate throttling of activity on one or more dies of a MCP is to occur, to prevent damage to the processor. As such, should a measured thermal value from one or more die indicate a level at or above throttle threshold 1710, throttling may begin.

As further illustrated, a thermal control level 1720 is also provided. This thermal control (Tctrl) value may be provided to a processor-external controller, such as a platform controller, to indicate a thermal level below which limited cooling solution control may be needed.

Still with reference to FIG. 17, when measured temperature is below thermal loadline 1700 such that operation is in a safe zone 1730, no power management or thermal-based constraints may be applied by a thermal control logic or other power controller of a processor. Instead, should a measured temperature exceed thermal loadline 1700 into an alert zone 1740, processor-internal and/or processor-external thermal and/or power management control may occur.

Understand that thermal loadline 1700 may be configured on a per part basis, using information obtained during manufacturing testing. In different embodiments, various information may be stored in a given non-volatile storage of a processor to enable identification of and/or generation of a thermal loadline during normal processor operation. The loadline for a given die may be defined, in an embodiment, as:

$$\text{Thermal loadline}(Tj\_\text{specification}\_i) = Tj\_\text{max}\_i - (TDP\_i - P\_i) * R\_ii \quad \text{(EQ. 1)}$$

where $Tj\_i$ is the junction temperature of the ith die component of the package; $Tj\_\text{max}\_i$ is the Tj_maximum limit of the ith die component, $P\_i$ is the measured power of the ith die component, and $R\_ii$ is a thermal resistance value used in defining the thermal loadline. A conservative value for $R\_ii$ would be $psi\_ja\_ii$, which is essentially a measure of how the temperature of ith die increases with power when maximum cooling is provided. Therefore, it is a resistance value and is measured in terms of Celsius per Watt (C/W). Understand that lower values can also be utilized for this value; and $TDP\_i$ is the TDP for the ith die of the package (where the TDP is specified based on a worst case workload for a given die).

In an embodiment, the thermal loadline may be computed for a worst case workload for the given component. As an example, for an on-package memory, this worst case workload may be a given memory-centric workload. For a CPU die, the worst case workload may be a given CPU-centric workload.

In execution of these die-centric workloads, the other dies may be held at lower operating levels, to minimize cross-die thermal effects. Note that by control according to a thermal loadline determined as above, temperature is maintained at lower levels for corresponding lower power values.

Referring now to Table 1, shown is a listing of thermal resistance values and time constants of a processor and heatsink assembly in accordance with an embodiment at various airflow rates. Note that the thermal time constants may be determined at constant flow and the input power to the processor undergoes a step change and processor die temperature increase/decrease is monitored as a function of time to determine the resistance values and thermal time constant values.

TABLE 1

| | Airflow | | |
|---|---|---|---|
| | 5 CFM | 7.5 CFM | 12 CFM |
| R1 (C/W) | 0.217 | 0.214 | 0.212 |
| R2 (C/W) | 0.310 | 0.226 | 0.154 |
| R3 (C/W) | 0.061 | 0.031 | 0.013 |
| $\tau_1$ (s) | 0.84 | 0.80 | 0.76 |
| $\tau_2$ (s) | 37.46 | 26.92 | 17.67 |
| $\tau_3$ (s) | 114.56 | 110.98 | 80.64 |

In this example, the resistance and time constant values were determined by studying temperature response to a step input in power. Note that R1 is 54% of the overall resistance at the highest design airflow in the above example. Die temperatures are also affected when there is a step change in airflow (e.g., airflow going from 5 CFM to 12 CFM). One can monitor die temperature as a function of time when processor power is held fixed and airflow is changed. One can extract thermal resistance values and thermal time constant values associated with change in airflow. Typically, the thermal time constant for die temperature to see a change in airflow is large (approximately 20 seconds). If a die takes about 20 seconds to see the effect of changes in fan speed (cooling), one has to pick a value R_ii that is associated with that long of a time constant. In Table 1 above at highest cooling, a time constant of 20 seconds would equate to approximately (R1+R2).

Note that temperature can rise significantly over a short period of time, namely short for a fan speed increase to have an impact on the die temperature. Therefore, in order to prevent thermal throttling, values between R1 and psi_ja (e.g., R1+R2+R3) may be used in defining the loadlines according to Equation 1.

The determined thermal loadlines may be stored in a given non-volatile storage of the processor. For example, in an embodiment Tjmax limit and slope (R_ii) may be stored for each die type as fused values. Such values may be used to represent a given thermal loadline. As such as used herein, storage of a thermal loadline may be understood to include storage of at least these values sufficient to recreate a complete thermal loadline.

During operation, these fused values may be accessed by a thermal control logic to enable calculation of a thermal gap or margin during actual processor operation (namely a margin extending into a safe zone at variance from the thermal loadline). With the thermal loadline of FIG. 17, safe zone 1730 is the area below thermal loadline 1700. In an embodiment, an exponential moving average corresponding to the first time constant ($\tau_1$) may be used for evaluating the thermal specification.

To dynamically determine a thermal margin for a given die, all thermal sensors on the given die type are polled and a maximum operating temperature (Tj) is determined. In addition, power consumption of the die is also monitored. This operating temperature (Tj) value is compared to the actual thermal specification for the die to compute the thermal margin. This thermal margin is computed for each die type. The minimum thermal margin may in turn be reported to the platform to enable fan speed control.

In one embodiment, the thermal margin may be determined as follows:

$$\text{Thermal\_Margin}\_i = Tj\_\text{Specification}\_i - Tj\_i \quad \text{(EQ. 2)}.$$

In real-time operation of a processor, power of a given die can change rapidly, making the Tj_specification change its value with it. To avoid this situation, an exponential moving average value of the calculated Tj_specification can be used in calculating the thermal margin. The exponential moving average is calculated over a thermally relevant time constant.

In turn, the minimum thermal margin may be determined according to:

$$\text{Minimum Thermal\_Margin} = \min(\text{Thermal\_Margin\_1}, \text{Thermal\_Margin\_2}, \ldots, \text{Thermal\_Margin\_die\_type\_}N) \quad \text{(EQ. 3)}.$$

By computing a loadline-based minimum thermal margin instead of a thermal margin to a throttle threshold, the thermal loadline lowers the average operating temperature of the device over its lifetime, and it provides an optimum thermal operating point to prevent throttling.

Note that the thermal loadline determination above may be based on Tj_max values instead of starting at a local ambient temperature. With this determination, the resulting thermal loadline works well for a MCP, since Tj_max value comprehends heating effects of adjacent dies.

Embodiments may also be used to determine optimal control temperature (Tcontrol) values for each die type based on the thermal specification. To this end, if a thermal sensor temperature is above Tcontrol, a cooling solution may be controlled accordingly. For example, a fan may ramp up. In one embodiment, a Tcontrol value can be calculated as:

$$T\text{control} = (TDP - \text{idle\_Power}) * R\_ii \quad \text{(EQ. 4)}.$$

In EQ. 4, idle power corresponds to the power level of the die when it is not doing any active work and the power is mainly the leakage power of the die. For a DRAM die, this may correspond to power dissipated by the die at zero memory bandwidth utilization.

This thermal control equation assumes that a processor may be operating at Tcontrol at an idle workload and a maximum (e.g., TDP) workload suddenly begins. The above Equation 4 may be used to calculate a Tcontrol value that will minimize thermal throttling. This Tcontrol value may be stored in an appropriate storage, e.g., in non-volatile memory along with the other stored thermal values, and can be used along with thermal loadline specification of EQ. 1 for each die type. As an example, a fabric die, which may not have a thermal throttling feature, can be controlled using this Tcontrol value computed using EQ. 4, to ensure that the die does not exceed its limit. While EQs. 1-4 above use Tj limits, one can easily rewrite the equations in terms of sensor temperature by accounting for hot spot to sensor location thermal resistance value.

Embodiments thus provide a loadline specification methodology for a multi-chip package that results in an improved bin split (percentage of manufactured packages meeting certain design specifications) and increased operating frequency.

Figure 18:
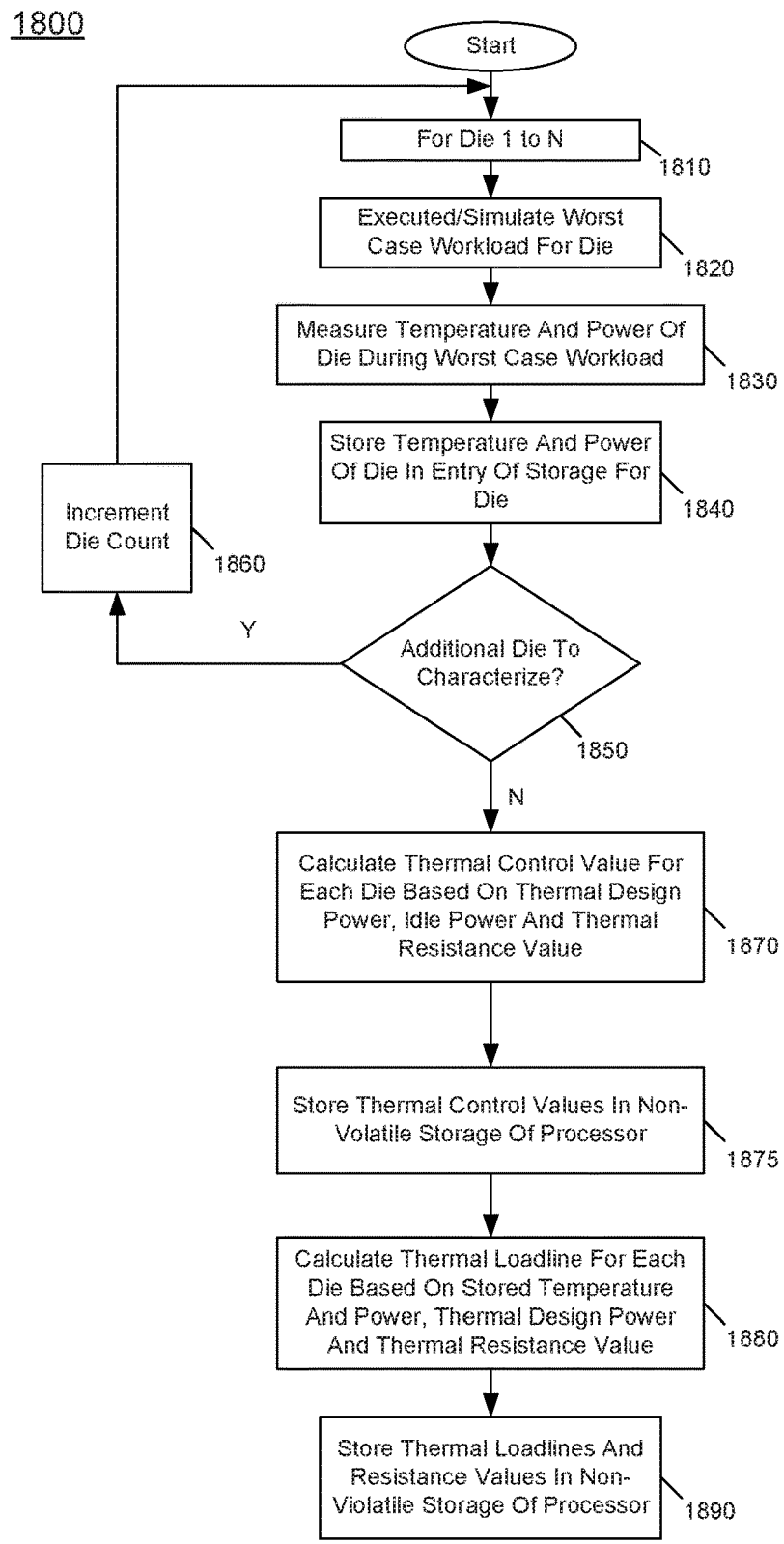
FIG. 18 is a flow diagram of a method in accordance with an embodiment of the present invention.

Referring now to FIG. 18, shown is a flow diagram of a method in accordance with an embodiment of the present invention. More specifically, method 1800 of FIG. 18 may be performed during manufacturing and characterization operations during manufacture of a processor or other SoC. To that end, method 1800 may be performed at least in part using one or more server computers or other computing systems within a manufacturing facility. This method enables characterization and formation of processors having stored therein configuration data as described herein that can be used during normal operation to perform thermal monitoring, communication and control operations as discussed herein. Note that this characterization can be done by simulations as well.

As shown, method 1800 may begin at block 1810 by selecting a given die of multiple die within a multi-chip package. Next at block 1820 a worst case workload for that die can be executed/simulated. For example, this worst case workload may correspond to a die-centric workload, such that the given die is the most active die within the package. Next at block 1830 temperature and power of the die can be measured during execution/simulation of this worst case workload. For example, one or more on-die thermal sensors can provide temperature information. In addition, one or more on-die power sensors or other sensors can be used to measure power consumption. Thus the Tj_max and TDP for the given die can be determined. Note also that Tj vs. power sensitivity can be determined by running less stressful workloads (psi_ja_ii=slope of Tj v. power). Next at block 1840 this information can be stored in an entry of storage for the die. Note that this storage of information in an entry for a die can be within a table, e.g., stored in a given server computer, manufacturing tool or so forth. In an embodiment, Tj, TDP and Rii, a value between 0 and psi_ja_ii may be stored. Next it is determined at diamond 1850 whether there are additional die to characterize. If so, the die count is incremented (block 1860), and control passes back to block 1810, for another iteration of the characterization operations.

Still referring to FIG. 18, if instead all die within a package have been appropriately characterized, control passes to block 1870. Next, based at least in part on the TDP value and thermal resistance value (per die), a thermal control value for the different dies may be calculated (block 1890), e.g., per above EQ. 4. This thermal control value may be stored in a non-volatile storage of the processor (block 1875). As an example, this non-volatile storage may be fuse storage within the processor, such as present on a CPU die within the processor. In other cases, separate non-volatile storage may be present within the processor, e.g., fuse storage associated with each of the separate die. In any event, this thermal control information may be permanently stored during the manufacture process.

Still with reference to FIG. 18, control next passes to block 1880 where a thermal loadline may be calculated for each die. More specifically, this thermal loadline may be calculated for each die based on the stored temperature and power (e.g., obtained as discussed above) along with other values, including a thermal design power value for the die and a thermal resistance value (along with the thermal control value). In one embodiment, the thermal loadline can be calculated according to Equation 1, discussed above. As such, each die may have an independent thermal loadline determined for it. Next at block 1890, the thermal loadlines and thermal resistance values can be stored in the non-volatile storage.

As described above, in one embodiment the thermal loadline can be stored simply by storage of Tjmax and Rii for the given core. Of course understand that in addition, TDP values for the different die also may be stored in this non-volatile storage. In other cases, at least some coordinate points for each thermal loadline (e.g., a given number of points on the loadline) may be stored to enable interpolation of other values of the loadline during control operations. Also, since a loadline may be a straight line, storing a point on the line (Tjmax, TDP) and slope (Rii) may provide sufficient information for interpolation. Note that the loadline is applicable above Tcntrol only. Understand while shown at this high level in the embodiment of FIG. 18, many variations and alternatives are possible.

Thus at the conclusion of method 1800, a processor is appropriately configured to enable access to multiple thermal loadlines and thermal control values during normal operation for various purposes, including determination of thermal margins for the different dies, from which a minimum margin can be determined and communicated, e.g., off-chip to a platform controller. In addition, such thermal loadline information may be used to perform thermal throttling, if it is determined that a measured temperature during operation exceeds a given thermal loadline. In addition, information including the thermal loadline may be used for other thermal and power management operations.

Figure 19:
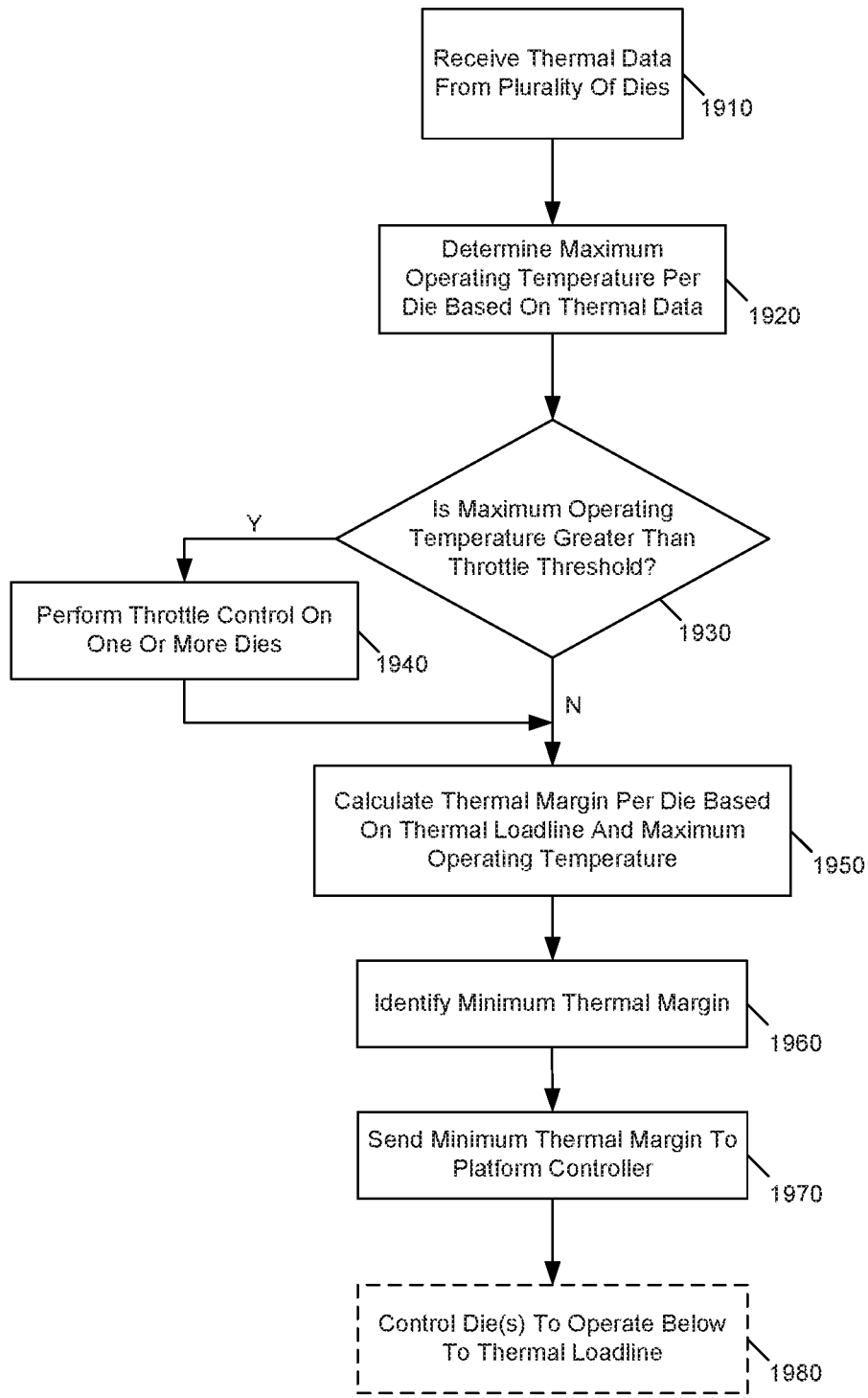
FIG. 19 is a flow diagram of a method in accordance with another embodiment of the present invention.

Referring now to FIG. 19, shown is a flow diagram of a method in accordance with another embodiment of the present invention. More specifically, method 1900 shown in FIG. 19 may be performed by hardware, software, and/or firmware, and combinations thereof. As an example, method 1900 may be performed by thermal control logic, such as hardware thermal control logic implemented within a power controller of a processor. As an example, a PCU of a processor, which in an embodiment may be implemented as a dedicated hardware microcontroller, may include such thermal control logic.

As illustrated, method 1900 begins by receiving thermal data from a plurality of dies (block 1910). In an embodiment, each of multiple die may include one or more thermal sensors. As discussed above, the thermal information may be received from such die, e.g., at given time intervals. Understand that in other cases, each die may at least partially process the thermal data (to generate a maximum temperature) prior to communication to the thermal control logic. In any event, control passes to block 1920 where a maximum operating temperature per die can be determined based on the thermal data. Then at diamond 1930 it is determined whether the maximum operating temperature of any of the die is greater than a throttle threshold (which may be a per-die threshold or an overall processor threshold). If so, control passes to block 1940 where throttle control may be performed on one or more dies. That is, due to this indication of temperature exceeding an undesired throttle threshold, immediate action may be taken to throttle activity on one or more dies within the processor to reduce heat. As an example, processor operations may be controlled by way of reducing operating frequency, throttling activity or other forms of throttling, including completely disabling activity in one or more cores.

Still referring to FIG. 19, instead if it is determined that the maximum operating temperature per die does not exceed a given throttle threshold, control passes to block 1950. There a thermal margin may be calculated per die. More specifically, this thermal margin may be determined based on the thermal loadline for the given die and the die's maximum operating temperature. In one embodiment, the thermal margin per die may be calculated according to Equation 2, above. After calculation of these thermal margins, control passes to block 1960 where the minimum thermal margin may be identified (e.g., according to Equation 3). Next at block 1970 this minimum thermal margin may be communicated to a platform controller. Note that the platform controller, which may receive this message via, e.g., a platform environmental control interface (PECI) interface, may perform various control based on such information. As an example, the platform controller may perform control of one or more cooling solutions based on such information. As an example, control of fan speed may be effected based, at least in part on this information. Of course, other control operations such as changing pump speed in the case of a liquid cooled system, also may be performed.

Still with reference to FIG. 19, at block 1980 the various dies may be controlled to operate below the corresponding thermal loadlines. That is, the thermal control logic may send information to other portions of a PCU to cause various operational parameters of the different die to be controlled to ensure that the temperature of the given die remains below the thermal loadline, such that adverse effects associated with throttling activity can be avoided. Understand while shown at this high level in the embodiment of FIG. 19, many variations and alternatives are possible.

Using thermal margin information determined in an MCP and other components of a platform, such as other MCPs within a given server platform, as well as other components on one or more motherboards of a platform, a platform controller may perform cooling solution control. In an embodiment, this platform controller may be implemented as a baseboard management controller (BMC). Still further, the cooling solution may correspond to one or more fans that can have their speed controlled by this BMC.

Figure 20:
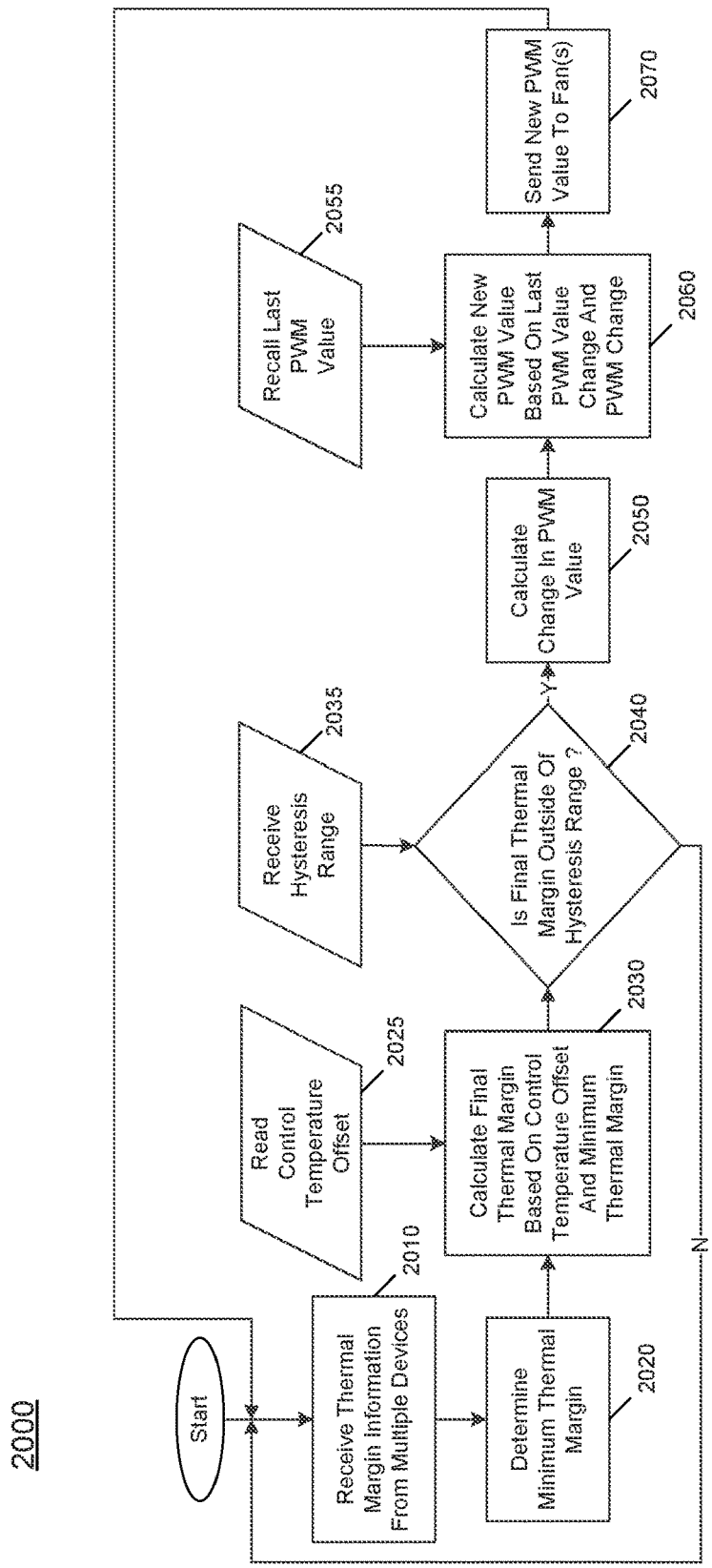
FIG. 20 is a flow diagram of a method for controlling a cooling solution in accordance with an embodiment.

Referring now to FIG. 20, shown is a flow diagram of a method for controlling a cooling solution in accordance with an embodiment. As shown in FIG. 20, method 2000 may be performed by a platform controller, such as a hardware baseband management controller, e.g., configured on a motherboard of a server platform, along with one or more MCPs, memory, network hardware and other hardware resources of a system. At a high level, method 2000 may be used to perform system level fan speed control by a BMC, based at least in part on thermal margin information obtained from various components on one or more circuit boards of a given platform. Thereafter, control signals, e.g., pulse width modulation (PWM) fan speed control signals may be sent to one or more fans or other portions of a cooling solution. In an embodiment, method 2000 may be performed at a regular interval, e.g., approximately every second. As thermal margins exceed a given range, fan speed increases, and instead as thermal margins fall below such ranges, fan speeds may be reduced.

As seen, method 2000 by receiving thermal margin information from multiple devices (block 2010). As an example, a minimum thermal margin may be reported from an MCP for the multiple die within the corresponding MCP. Other components of the server platform may be similarly configured to report a corresponding minimal thermal margin. In other cases, certain components may simply provide thermal information, e.g., thermal sensor data, and the BMC itself may determine an appropriate thermal margin for the corresponding component or components.

In any case, control passes next to block 2020 where a minimum thermal margin can be determined. In an embodiment, this minimum thermal margin may correspond to the smallest thermal margin identified. Thereafter, a final thermal margin can be calculated (block 2030). More specifically, this final thermal margin may be calculated based on the minimum thermal margin and a control temperature offset, which may be read from a given storage (block 2025). Note that this control temperature offset may be an offset from a control or target temperature for tuning fan reaction.

Still with reference to FIG. 20, next at diamond 2040 it is determined whether this final thermal margin is outside of a hysteresis range. This hysteresis range may be read or received at block 2035. The hysteresis range corresponds to a level of hysteresis in which the margin is allowed to vary without updating control parameters. If it is determined that this final thermal margin is not outside the hysteresis range, no further action is taken for this loop of operation, and instead control passes back to block 2010.

Otherwise if the calculated final thermal margin exceeds this hysteresis range, control passes to block 2050. At block 2050 a change in a pulse width modulation (PWM) value can be calculated. In an embodiment, this PWM value may be an indication of fan speed (e.g., a percentage value) to cause one or more fans to operate according to this given fan speed. In an embodiment, a proportional integral derivative (PID) control technique may be used to calculate the PWM change based at least in part on the final thermal margin.

Next, control passes to block 2060 where a new PWM value may be calculated. More specifically, this value may be calculated based on the last PWM value (as recalled at block 2055) and the calculated PWM change value. Thereafter at block 2070, this new PWM value is sent to one or more fans, to enable update of fan speed to enable improved thermal control as described herein. Understand while shown at this high level in the embodiment of FIG. 20, many variations and alternatives are possible.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 21:
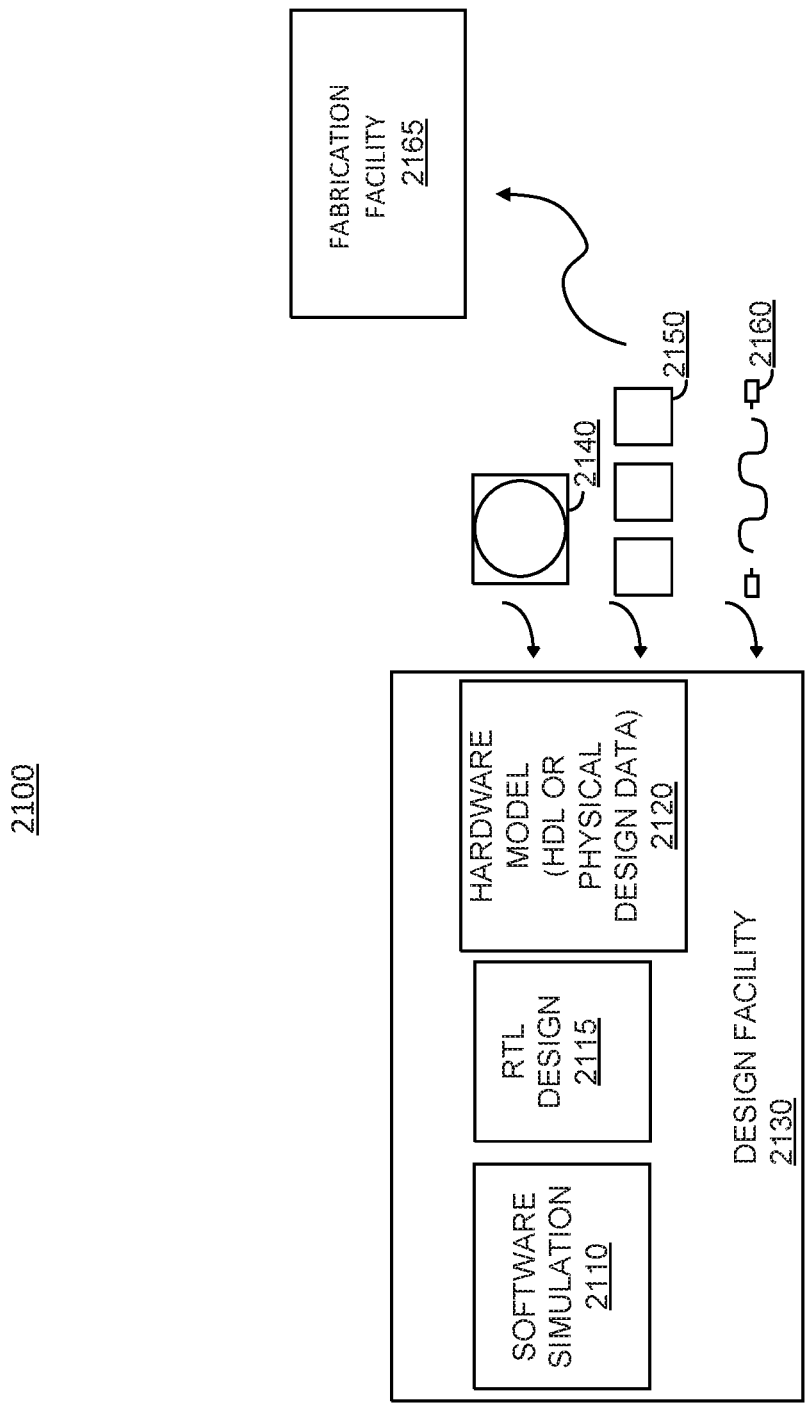
FIG. 21 is a block diagram illustrating an IP core development system used to manufacture an integrated circuit to perform operations according to an embodiment.

FIG. 21 is a block diagram illustrating an IP core development system 1600 that may be used to manufacture an integrated circuit to perform operations according to an embodiment. The IP core development system 2100 may be used to generate modular, reusable designs that can be incorporated into a larger design or used to construct an entire integrated circuit (e.g., an SoC integrated circuit). A design facility 2130 can generate a software simulation 2110 of an IP core design in a high level programming language (e.g., C/C++). The software simulation 2110 can be used to design, test, and verify the behavior of the IP core. A register transfer level (RTL) design can then be created or synthesized from the simulation model. The RTL design 2115 is an abstraction of the behavior of the integrated circuit that models the flow of digital signals between hardware registers, including the associated logic performed using the modeled digital signals. In addition to an RTL design 2115, lower-level designs at the logic level or transistor level may also be created, designed, or synthesized. Thus, the particular details of the initial design and simulation may vary.

The RTL design 2115 or equivalent may be further synthesized by the design facility into a hardware model 2120, which may be in a hardware description language (HDL), or some other representation of physical design data. The HDL may be further simulated or tested to verify the IP core design. The IP core design can be stored for delivery to a third party fabrication facility 2165 using non-volatile memory 2140 (e.g., hard disk, flash memory, or any non-volatile storage medium). Alternately, the IP core design may be transmitted (e.g., via the Internet) over a wired connection 2150 or wireless connection 2160. The fabrication facility 2165 may then fabricate an integrated circuit that is based at least in part on the IP core design. The fabricated integrated circuit can be configured to perform operations in accordance with at least one embodiment described herein.

The following examples pertain to further embodiments.

In one example, a processor comprises: a first die including at least one core and at least one first die thermal sensor; a second die including at least one memory and at least one second die thermal sensor; and a thermal controller to receive first thermal data from the at least one first die thermal sensor and second thermal data from the at least one second die thermal sensor, calculate a first thermal margin for the first die based at least in part on the first thermal data and a first thermal loadline for the first die and calculate a second thermal margin for the second die based at least in part on the second thermal data and a second thermal loadline for the second die.

In an example, the thermal controller is to communicate a minimum thermal margin of the first thermal margin and the second thermal margin to a platform controller coupled to the processor, to enable the platform controller to control a cooling solution.

In an example, the first die comprises a power controller comprising the thermal controller, and where the power controller is to throttle activity of at least one of the first die and the second die if a maximum operating temperature obtained from the first thermal data exceeds a first throttle threshold.

In an example, the power controller is to control one or more operating parameters of at least the first die to maintain a temperature of the first die below the first thermal loadline for the first die.

In an example, the processor further comprises a non-volatile storage to store at least some information of the first thermal loadline for the first die, the first thermal loadline determined based at least in part on a maximum operating temperature of the first die, a first thermal design power for the first die, a first measured power of the first die, and a first thermal resistance of the first die.

In an example, the at least some information comprises the maximum operating temperature and the first thermal resistance.

In an example, the thermal controller, based on a measured power of the first die, is to obtain at least one thermal value from the first thermal loadline for the first die and calculate the first thermal margin as a difference of the at least one thermal value and a first measured operating temperature of the first thermal data.

In an example, the thermal controller is to access an entry of a non-volatile storage to obtain a maximum operating temperature of the first die and a first thermal resistance of the first die, and calculate the at least one thermal value based on the maximum operating temperature, the first thermal resistance, a thermal design power for the first die and the measured power.

In an example, the thermal controller is to access an entry of a non-volatile storage to obtain a thermal control value for the first die and communicate the thermal control value to a platform controller coupled to the processor, to enable the platform controller to control a cooling solution.

In an example, the processor further comprises a third die including fabric circuitry and at least one third die thermal sensor, where the thermal controller is to receive third thermal data from the at least one third die thermal sensor, calculate a third thermal margin for the third die based at least in part on the third thermal data and a third thermal loadline for the third die, where the first thermal loadline, the second thermal loadline and the third thermal loadline comprise independent thermal loadlines having loadline generation information stored in a non-volatile storage of the processor.

Note that the above processor can be implemented using various means.

In an example, the processor comprises a SoC incorporated in a user equipment touch-enabled device.

In another example, a system comprises a display and a memory, and includes the processor of one or more of the above examples In another example, a method comprises: causing execution of a selected die workload for a plurality of dies of a processor; measuring a temperature and a power of the plurality of dies during the execution of the selected die workload; calculating, for each of the plurality of dies, a thermal loadline based at least in part on the measured temperature and the power; and storing the thermal loadline for each of the plurality of dies in a non-volatile storage of the processor.

In an example, the method further comprises calculating the thermal loadline further based on a thermal design power and a thermal resistance value for the corresponding die.

In an example, the method further comprises storing the thermal resistance value in the non-volatile storage.

In an example, storing the thermal loadline for a first die comprises storing a measured temperature of the first die and a thermal resistance value for the first die, where the measured temperature comprises a maximum measured operating temperature of the first die during the execution of the selected die workload.

In an example, storing the thermal loadline comprises storing the thermal loadline in a fuse storage of the processor.

In an example, the method further comprises calculating a thermal control value for each of the plurality of dies, based at least in part on a thermal design power, an idle power, and a thermal resistance value for the corresponding die, and storing the thermal control value for each of the plurality of dies in the non-volatile storage.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a plurality of processors, at least one of the plurality of processors comprising a multi-chip package including a first die, a second die and a thermal controller to receive first thermal data from a first thermal sensor of the first die and second thermal data from a second thermal sensor of the second die, calculate a first thermal margin for the first die based at least in part on the first thermal data and a first thermal loadline for the first die, calculate a second thermal margin for the second die based at least in part on the second thermal data and a second thermal loadline for the second die and determine a minimum thermal margin of the first and second thermal margins; a network circuit coupled to the plurality of processors; a cooling solution including at least one fan; and a platform controller to receive the minimum thermal margin and thermal margin information from others of the plurality of processors, and calculate a control value for the at least one fan based at least in part on the minimum thermal margin and the thermal margin information.

In an example, the platform controller comprises a proportional integral controller to calculate the control value.

In an example, the control value comprises a pulse width modulated signal.

In an example, the platform controller is to calculate a first thermal margin based on the minimum thermal margin, the thermal margin information and an offset value.

In an example, the platform controller is to calculate the control value if the first thermal margin exceeds a range value, and otherwise maintain a current control value.

In an example, the thermal controller, based on a measured power of the first die, is to obtain at least one thermal value from the first thermal loadline for the first die and calculate the first thermal margin as a difference of the at least one thermal value and a first measured operating temperature of the first thermal data.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first die including at least one core and at least one first die thermal sensor;
   a second die including at least one memory and at least one second die thermal sensor; and a power controller comprising a thermal controller to receive first thermal data from the at least one first die thermal sensor and second thermal data from the at least one second die thermal sensor, calculate a first thermal margin for the first die based at least in part on the first thermal data and a first thermal loadline for the first die and calculate a second thermal margin for the second die based at least in part on the second thermal data and a second thermal loadline for the second die, wherein the power controller is to throttle activity of at least one of the first die and the second die if a maximum operating temperature obtained from the first thermal data exceeds a first throttle threshold, wherein the thermal controller is to communicate a minimum thermal margin of the first thermal margin and the second thermal margin, and not a maximum thermal margin of the first thermal margin and the second thermal margin, to a platform controller coupled to the processor, to enable the platform controller to control a cooling solution.

2. The processor of claim 1, wherein the power controller is to control one or more operating parameters of at least the first die to maintain a temperature of the first die below the first thermal loadline for the first die.

3. The processor of claim 1, wherein the processor further comprises a non-volatile storage to store at least some information of the first thermal loadline for the first die, the first thermal loadline determined based at least in part on a maximum operating temperature of the first die, a first thermal design power for the first die, a first measured power of the first die, and a first thermal resistance of the first die.

4. The processor of claim 3, wherein the at least some information comprises the maximum operating temperature and the first thermal resistance.

5. The processor of claim 1, wherein the thermal controller, based on a measured power of the first die, is to obtain at least one thermal value from the first thermal loadline for the first die and calculate the first thermal margin as a difference of the at least one thermal value and a first measured operating temperature of the first thermal data.

6. The processor of claim 5, wherein the thermal controller is to access an entry of a non-volatile storage to obtain a maximum operating temperature of the first die and a first thermal resistance of the first die, and calculate the at least one thermal value based on the maximum operating temperature, the first thermal resistance, a thermal design power for the first die and the measured power.

7. The processor of claim 1, wherein the thermal controller is to access an entry of a non-volatile storage to obtain a thermal control value for the first die and communicate the thermal control value to the platform controller, to enable the platform controller to control the cooling solution.

8. The processor of claim 1, further comprising a third die including fabric circuitry and at least one third die thermal sensor, wherein the thermal controller is to receive third thermal data from the at least one third die thermal sensor, calculate a third thermal margin for the third die based at least in part on the third thermal data and a third thermal loadline for the third die, wherein the first thermal loadline, the second thermal loadline and the third thermal loadline comprise independent thermal loadlines having loadline generation information stored in a non-volatile storage of the processor.

9. A system comprising:
a plurality of processors, at least one of the plurality of processors comprising a multi-chip package including a first die, a second die and a thermal controller to receive first thermal data from a first thermal sensor of the first die and second thermal data from a second thermal sensor of the second die, calculate a first thermal margin for the first die based at least in part on the first thermal data and a first thermal loadline for the first die, calculate a second thermal margin for the second die based at least in part on the second thermal data and a second thermal loadline for the second die and determine a minimum thermal margin of the first and second thermal margins;

a network circuit coupled to the plurality of processors;

a cooling solution including at least one fan; and a platform controller to receive the minimum thermal margin and not receive a maximum thermal margin of the first and second thermal margins, and further receive thermal margin information from others of the plurality of processors, and calculate a control value for the at least one fan based at least in part on the minimum thermal margin and the thermal margin information.

10. The system of claim 9, wherein the platform controller comprises a proportional integral controller to calculate the control value.

11. The system of claim 10, wherein the control value comprises a pulse width modulated signal.

12. The system of claim 9, wherein the platform controller is to calculate a first thermal margin based on the minimum thermal margin, the thermal margin information and an offset value.

13. The system of claim 12, wherein the platform controller is to calculate the control value if the first thermal margin exceeds a range value, and otherwise maintain a current control value.

14. The system of claim 9, wherein the thermal controller, based on a measured power of the first die, is to obtain at least one thermal value from the first thermal loadline for the first die and calculate the first thermal margin as a difference of the at least one thermal value and a first measured operating temperature of the first thermal data.

* * * * *